US010527445B2

(12) United States Patent
Tertoolen et al.

(10) Patent No.: US 10,527,445 B2
(45) Date of Patent: Jan. 7, 2020

(54) APPARATUS AND METHODS OF DISPLAYING NAVIGATION INSTRUCTIONS

(71) Applicant: TomTom Navigation B.V., Amsterdam (NL)

(72) Inventors: Simone Francine Tertoolen, Rotterdam (NL); Cornelis Klaas van Dok, Kudelstaart (NL)

(73) Assignee: TOMTOM NAVIGATION B.V., Amsterdam (NL)

(*) Notice: Subject to any disclaimer, the term of this patent is extended or adjusted under 35 U.S.C. 154(b) by 163 days.

(21) Appl. No.: 15/028,442

(22) PCT Filed: Oct. 10, 2014

(86) PCT No.: PCT/EP2014/071756
§ 371 (c)(1),
(2) Date: Apr. 11, 2016

(87) PCT Pub. No.: WO2015/052313
PCT Pub. Date: Apr. 16, 2015

(65) Prior Publication Data
US 2016/0252363 A1 Sep. 1, 2016

(30) Foreign Application Priority Data

Oct. 11, 2013 (GB) .................................. 1318049.2
Nov. 18, 2013 (GB) .................................. 1320360.9
Jan. 6, 2014 (GB) .................................. 1400161.4

(51) Int. Cl.
G01C 21/36 (2006.01)
G01S 19/42 (2010.01)
G06K 9/00 (2006.01)

(52) U.S. Cl.
CPC ....... G01C 21/3658 (2013.01); G01C 21/367 (2013.01); G01C 21/3635 (2013.01);
(Continued)

(58) Field of Classification Search
None
See application file for complete search history.

(56) References Cited

U.S. PATENT DOCUMENTS 6,889,138 B1 5/2005 Krull et al.
7,127,350 B2 10/2006 Oikubo
(Continued)

FOREIGN PATENT DOCUMENTS

CN 1754084 A 3/2006
CN 101285689 A 10/2008
(Continued)

OTHER PUBLICATIONS

Search Report of United Kingdom Application No. GB1400158.0 dated Jul. 7, 2014.
(Continued)

Primary Examiner — Jelani A Smith
Assistant Examiner — Kelly D Williams

(57) ABSTRACT

A device is disclosed for generating navigation instructions for display on a display device of a portable navigation device, comprising: means for accessing a repository storing digital map data pertaining to a navigable network along which the navigation device can travel, the digital map data including data pertaining to available lanes of the navigable network; means for generating, for display on the display device, a three-dimensional perspective view of a model representative of the map data as though from a camera positioned at an elevation and pitch angle behind a current position of the portable navigation device, that is updated to follow the device as it travels along a planned route, wherein the three-dimensional perspective view shows the available lanes of the navigable network, and wherein the planned route to be followed is shown in the view as a line, the line showing the route to be followed as passing along a determined current lane in which the device is travelling; and
(Continued)

means for adapting the generated view, in response to detecting that the determined current lane in which the device is travelling differs from a lane or lanes associated with a manoeuvre to be made at an upcoming decision point in order to follow the planned route, such that the line showing the route to be followed indicates an instruction to the user to change lanes. Methods of operation of the device, and related computer software, are also disclosed.

12 Claims, 17 Drawing Sheets

(52) U.S. Cl.
CPC ..... *G01C 21/3647* (2013.01); *G01C 21/3655* (2013.01); *G01C 21/3667* (2013.01); *G01C 21/3676* (2013.01); *G01S 19/42* (2013.01); *G06K 9/00798* (2013.01)

(56) References Cited

U.S. PATENT DOCUMENTS

| 8,024,117 | B2 | 9/2011 | Tsurumi | |
| 8,244,454 | B2* | 8/2012 | Tertoolen | G01C 21/3682 701/436 |
| 8,260,543 | B2 | 9/2012 | Han | |
| 9,082,018 | B1 | 7/2015 | Laska et al. | |
| 2002/0053984 | A1* | 5/2002 | Yamashita | G01C 21/3658 340/988 |
| 2005/0149262 | A1 | 7/2005 | Oikubo | |
| 2007/0106460 | A1 | 5/2007 | Nakayama et al. | |
| 2008/0189035 | A1 | 8/2008 | Tsurumi | |
| 2008/0243380 | A1 | 10/2008 | Han | |
| 2008/0288163 | A1* | 11/2008 | Asano | G01C 21/3658 701/118 |
| 2011/0106446 | A1 | 5/2011 | Waeller et al. | |
| 2011/0279452 | A1 | 11/2011 | Ibe et al. | |
| 2012/0120108 | A1 | 5/2012 | Roessger et al. | |
| 2012/0316775 | A1* | 12/2012 | Hayashi | G01C 21/3438 701/423 |
| 2014/0218509 | A1* | 8/2014 | Kondo | G01C 21/3647 348/118 |
| 2016/0231134 | A1 | 8/2016 | Nguyen Kim et al. | |

FOREIGN PATENT DOCUMENTS

| CN | 101573590 A | 11/2009 |
| CN | 102027329 A | 4/2011 |
| CN | 103234546 A | 8/2013 |
| DE | 10023160 A1 | 11/2000 |
| EP | 1357357 A1 | 10/2003 |
| EP | 1460604 A2 | 9/2004 |
| EP | 1584897 A2 | 10/2005 |
| EP | 0841537 B1 | 10/2006 |
| EP | 2192554 | 6/2010 |
| EP | 2192554 A1 | 6/2010 |
| EP | 2244242 A1 | 10/2010 |
| EP | 2605231 A2 | 6/2013 |
| JP | H10281795 A | 10/1998 |
| JP | 2001324347 A | 11/2001 |
| JP | 2002257576 A | 9/2002 |
| JP | 2006098348 A | 4/2006 |
| JP | 2008122150 A | 5/2008 |
| JP | 2010237178 A | 10/2010 |
| JP | 2011527754 A | 11/2011 |
| WO | 2009028085 A1 | 3/2009 |
| WO | 2009118911 A1 | 10/2009 |
| WO | 2013065256 A1 | 5/2013 |

OTHER PUBLICATIONS

Search Report of United Kingdom Application No. GB1400161.4 dated Jul. 7, 2014.
ISR Application No. PCT/EP/2014/071755 dated Oct. 10, 2014.
ISR Application No. PCT/EP/2014/071756 dated Oct. 10, 2014.
Raghuraman Gopalan et al., A Learning Approach Towards Detection and Tracking of Lane Markings, IEEE Transactions on Intelligent Transportation Systems, vol. XX, No. XX, 20XX.
Junhwa Hur et al, Multi-lane detection in urban driving environments using conditional random fields—abstract, IEEE Xplore Digital Library.
Stephan Sehestedt At Al, Efficient Lane Detection and Tracking in Urban Environments, The Arc Centre of Excellence for Autonomous Systems, The University of Technology, Sydney, Australia.
King Hann Lim et al, Lane-Vehicle Detection and Tracking, Proceedings of the International MultiConference of Engineers and Computer Scientists 2009 vol. II IMECS 2009, Mar. 18-20, 2009, Hong Kong.

\* cited by examiner

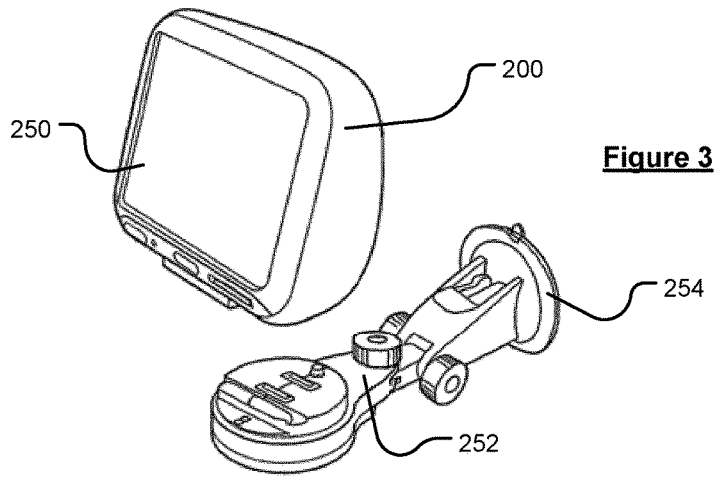
Figure 3
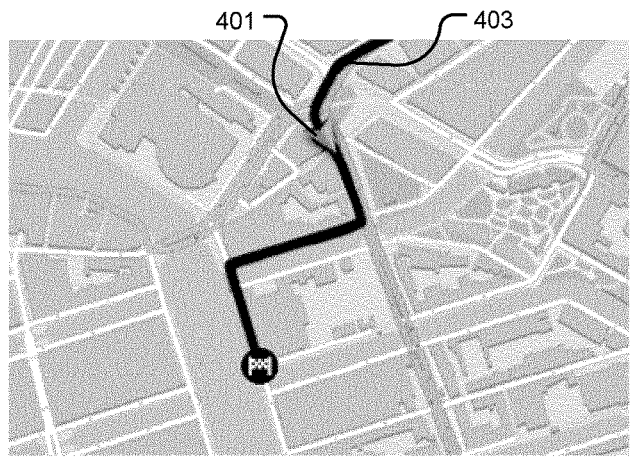
Figure 4A
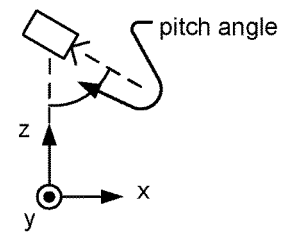
Figure 4C
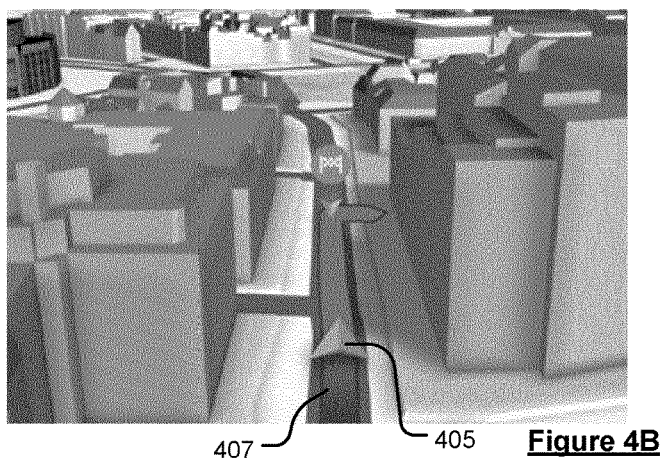
Figure 4B
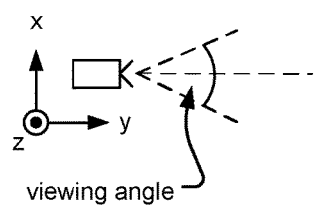

1008  Figure 16E

APPARATUS AND METHODS OF DISPLAYING NAVIGATION INSTRUCTIONS

The present application is the National Stage of International Application No. PCT/EP2014/071756, filed Oct. 10, 2014 and designating the United States, which claims benefit to United Kingdom Patent Application GB 1318049.2 filed on Oct. 11, 2013, GB 1320360.9 filed on Nov. 18, 2013, and GB 1400161.4 filed on Jan. 6, 2014. The entire content of these applications is incorporated herein by reference.

FIELD OF THE INVENTION

This invention relates to methods and systems for generating and displaying navigation instructions to user, preferably in respect of calculated route to a destination. Illustrative embodiments of the invention relate to portable navigation devices (so-called PNDs), in particular PNDs that include means for determining their current position.

BACKGROUND TO THE INVENTION

Portable navigation devices (PNDs) that include global navigation satellite systems (GNSS), e.g. global positioning system (GPS), signal reception and processing functionality are well known, and are widely employed as in-car or other vehicle navigation systems. It will be appreciated, that portable navigation devices may use other means to determine their location, such as using the mobile telecommunications, surface beacons or the like.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power, and optionally data signals, can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account historical, existing and/or predicted traffic and road information.

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, an on-line route planning and navigation facility is provided at routes.tomtom.com, which facility allows a user to enter a start point and a destination, whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide, the route selection process, for example by specifying that certain routes, roads, locations or criteria are to be avoided or are mandatory for a particular journey. The route calculation aspect of the PND forms one primary function, and navigation along such a route is another primary function.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above provide a reliable means for enabling users to navigate from one position to another.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of the current road and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

As mentioned above, there are a number of typical ways of providing navigation instructions to a user to allow them to follow a predetermined route; such navigation instructions commonly being referred to as turn-by-turn instructions. Most rely on displaying a representation of the world, and typically the road network, around the current position of the device and/or user, together with graphical icons indicating the current position of the device and/user and the route to be followed. The representation of the world will typically be a computer generated image from a particular point of view.

For example, one common representation is a two-dimensional (2D) view in which an image is generated as though from a camera (see FIG. 4C) positioned at an elevated position, in the z-direction, and with a pitch angle of 0° so as to show a bird's eye view of the area around the current position of the device. An example of such a view is shown in FIG. 4A and in which the current position of the device is shown by icon 401 and the predetermined route being followed is shown by the line 403. In this view, the camera may move in the x-y plane (i.e. the plane perpendicular to the z-axis and thus parallel to the surface on which the device is moving) so as to track the movements of the device along the route.

Another common representation is a three-dimensional (3D) view in which an image is generated as though from a camera positioned at an elevated position, but which has a pitch angle of 30° for example (a 90° pitch angle being such that the camera is pointed parallel to the plane of the surface) so as to show a perspective view of the area around the current position of the device. An example of such a view is shown in FIG. 4B, and wherein it will be appreciated the camera is located at a predetermined position behind the current position of the device, i.e. in the x-y plane, based on the direction of travel of the device, so that an icon 405 representative of the current position of the device can be shown in the view. In this view the camera will typically track the movements of the device along the predetermined route 407; the viewing angle of the camera thus being centred along the direction of travel of the device (or along the path of the predetermined route).

For some complex junctions, it is also known to show a combination of the 3D guidance view together with a schematic view of the approaching junction to the user showing the manoeuvre to be made in more detail. An example of such a view is shown in FIG. 5 in which the guidance view 500 is shown on the left side of the screen and the junction view 501 is shown on the right side of the screen. More specifically, the guidance view 500 displays the route to be followed by the line 502, the current position of the device by the icon 503, and the manoeuvre to be made at the next junction by the arrow 404. Meanwhile, in the junction view 501, the arrows 408 indicate which lanes of the road the user needs to be in to complete the desired manoeuvre. Despite these improvements to the standard guidance modes, e.g. as shown in FIGS. 4A and 4B, however, the Applicant has recognised that since two screens 500 and 501 are needed to provide the user with sufficient information to perform a manoeuvre, and the user is required to take different information from each screen, then this can lead to confusion.

Another method of providing navigation (or guidance) instructions is to superpose the instructions over images from a camera showing the area in front of the device in order to "augment reality". Additional details about such devices can be found, for example, in WO 2006/132522 A1 published 14 Dec. 2006; the entire content of which is incorporated herein by reference. Similarly, and rather than superposing the instructions over a camera image and displaying the resultant combination on a display screen, it is also known to project the instructions, e.g. onto surface, as part of a heads-up display (HUD) such that the user can see the instructions in their field of view As will be appreciated, however, and particularly in the case of complex junctions and intersections, displaying instructions in this manner do not always provide the user with sufficient insight as to the composition of an approaching junction or the manoeuvres that need to be made at the junction.

The Applicant has therefore realised that there remains a need for improved methods of displaying navigation instructions to a user.

SUMMARY OF THE INVENTION

In accordance with a first aspect of the invention there is provided a method of generating navigation instructions for display on a display device of a portable navigation device, the method comprising:

accessing a repository storing digital map data pertaining to a navigable network along which the navigation device can travel;

generating, for display on the display device, a three-dimensional perspective view of a model representative of the map data as though from a camera positioned at an elevation and pitch angle behind a current position of the portable navigation device, that is updated to follow the device as it travels along a planned route through the navigable network; and generating, in response to detecting that the current position of the navigation device is closer than a predetermined distance to a decision point in the planned route, a fast forward preview of the upcoming decision point by advancing the position of the camera for the three-dimensional perspective view along the planned route at a speed faster than the rate of travel of the current position of the device.

The present invention extends to a device, preferably a navigation device, for carrying out a method in accordance with any of the aspects or embodiments of the invention herein described.

Thus, in accordance with a second aspect of the invention there is provided a device for generating navigation instructions for display on a display device of a portable navigation device, the device comprising:

means for accessing a repository storing digital map data pertaining to a navigable network along which the navigation device can travel;

means for generating, for display on the display device, a three-dimensional perspective view of a model representative of the map data as though from a camera positioned at an elevation and pitch angle behind a current position of the portable navigation device, that is updated to follow the device as it travels along a planned route through the navigable network; and means for generating, in response to detecting that the current position of the navigation device is closer than a predetermined distance to a decision point in the planned route, a fast forward preview of the upcoming decision point by advancing the position of the camera for the three-dimensional perspective view along the planned route at a speed faster than the rate of travel of the current position of the device.

As will be appreciated by those skilled in the art, this further aspect of the present invention can and preferably does include any one or more or all of the preferred and optional features of the invention described herein in respect of any of the other aspects of the invention, as appropriate. If not explicitly stated, the device of the present invention herein may comprise means for carrying out any step described in relation to the method of the invention in any of its aspects or embodiments, and vice versa.

The present invention is a computer implemented invention, and any of the steps described in relation to any of the aspects or embodiments of the invention may be carried out under the control of a set of one or more processors. The means for carrying out any of the steps described in relation to the system may be a set of one or more processors.

In general, the device of the present invention in any of its embodiments may be at least one processing device. The or a processing device may be a navigation device, whether a portable navigation device (PND) or an integrated device, or may be a server.

In embodiments where the method is implemented on a navigation device, the device comprises position detection means for determining the position of the device, e.g. a global navigation satellite system (GNSS), e.g. GPS or GLONASS, receiver. As will be appreciated the device may use other means for determining its current location as desired, e.g. terrestrial beacons, the mobile telecommunications network, etc.

Accordingly, in an embodiment, there is provided a portable navigation device, comprising:

one or more processors;

position detection means for determining the position of the navigation device;

a display device;

repository storing digital map data pertaining to a navigable network along which the navigation device can travel; and memory comprising instructions which when executed by one or more of the processors causes the navigation device to:

generate, for display on the display device, a three-dimensional perspective view of a model representative of the map data as though from a camera positioned at an elevation and pitch angle behind a current detected position of the navigation device, that is updated to follow the device as it travels along a planned route through the navigable network; and generate, in response to detecting that the current position of the navigation device is closer than a predetermined distance to a decision point in the planned route, a fast forward preview of the upcoming decision point by advancing the position of the camera for the three dimension perspective view along the planned route at a speed faster than the rate of travel of travel of the current position of the device.

In embodiments where the method is implemented on a server, the server preferably periodically receives the current position of a navigation device, and transmits the generated navigation instructions for display on a display device of the navigation device.

In embodiments, the pitch angle of the camera and/or the elevation of the camera are changed during the fast forward preview. The pitch angle may be increased during the fast forward preview from between 20° to 40° to between 50° to 70°. The elevation may be decreased during the fast forward preview. Thus, in embodiments, the camera is altered so as to provide an apparent zoomed in view during the fast forward preview. In embodiments, the fast forward preview is such that the current position of the device is no longer visible in the preview. Preferably, the pitch angle and elevation of the camera are changed back once the camera resumes tracking the current position of the device.

Therefore, it will be appreciated that, during the fast forward preview, the position of the camera is preferably advanced to the decision point faster than the device whereupon the camera stops to provide a preview of the decision point. In such embodiments, when the current position of the device catches up with the camera at the decision point, the camera resumes tracking the current position of the device.

In embodiments, instructions further cause the fast forward preview of the decision point to be abandoned such that the camera moves to revert to tracking the current position of the device manually, on receipt of user input, or automatically, in response to slow progress of the position of the device or a deviation from a planned route. In embodiments, the device is further operable to cause the previously abandoned fast forward preview of the decision point to be resumed in response to user input and/or resumed progress in the rate of travel of the device.

In embodiments, the navigable network is a road network and the predetermined distance is dependent on a functional road class of the road the device is currently travelling along as stored in the digital map data.

In embodiments, the decision point in the digital map is a junction or an intersection or a location within the digital map where a user of the device is able to opt to navigate along one of a number of available routes in the navigable network, including the planned route.

In embodiments, the method further comprises generating, for display on the display device, a line to be followed indicating the planned route, wherein the three-dimensional perspective view shows the available lanes of the navigable network and the line shows the route to be followed as passing along a determined current lane in which the device is travelling. In response to detecting that the determined current lane in which the device is travelling differs from a lane or lanes associated with a manoeuvre to be made at an upcoming decision point, e.g. an approaching junction, in order to follow the planned route, the generated view is adapted such that the line showing the route to be followed indicates an instruction to the user to change lanes.

It is considered that the generation of navigation instructions indicating that a user needs to change lanes is new and inventive in its own right.

Thus, according to another aspect of the invention there is provided a method of generating navigation instructions for display on a display device of a portable navigation device, the method comprising:

accessing a repository storing digital map data pertaining to a navigable network along which the navigation device can travel, the digital map data including data pertaining to available lanes of the navigable network;

generating, for display on the display device, a three-dimensional perspective view of a model representative of the map data as though from a camera positioned at an elevation and pitch angle behind a current position of the portable navigation device, that is updated to follow the device as it travels along a planned route, wherein the three-dimensional perspective view shows the available lanes of the navigable network, and wherein the planned route to be followed is shown in the view as a line, the line showing the route to be followed as passing along a determined current lane in which the device is travelling; and adapting the generated view, in response to detecting that the determined current lane in which the device is travelling differs from a lane or lanes associated with a manoeuvre to be made at an upcoming decision point in order to follow the planned route, such that the line showing the route to be followed indicates an instruction to the user to change lanes.

The present invention extends to a device, preferably a navigation device, for carrying out a method in accordance with any of the aspects or embodiments of the invention herein described.

Thus, in accordance with a further aspect of the invention there is provided a device for generating navigation instructions for display on a display device of a portable navigation device, the device comprising:

means for accessing a repository storing digital map data pertaining to a navigable network along which the navigation device can travel, the digital map data including data pertaining to available lanes of the navigable network;

means for generating, for display on the display device, a three-dimensional perspective view of a model representative of the map data as though from a camera positioned at an elevation and pitch angle behind a current position of the portable navigation device, that is updated to follow the device as it travels along a planned route, wherein the three-dimensional perspective view shows the available lanes of the navigable network, and wherein the planned route to be followed is shown in the view as a line, the line showing the route to be followed as passing along a determined current lane in which the device is travelling; and means for adapting the generated view, in response to detecting that the determined current lane in which the device is travelling differs from a lane or lanes associated with a manoeuvre to be made at an upcoming decision point in order to follow the planned route, such that the line showing the route to be followed indicates an instruction to the user to change lanes.

As will be appreciated by those skilled in the art, this further aspect of the present invention can and preferably does include any one or more or all of the preferred and optional features of the invention described herein in respect of any of the other aspects of the invention, as appropriate. If not explicitly stated, the device of the present invention herein may comprise means for carrying out any step described in relation to the method of the invention in any of its aspects or embodiments, and vice versa.

The present invention, in accordance with these further aspects, is a computer implemented invention, and any of the steps described in relation to any of the aspects or embodiments of the invention may be carried out under the control of a set of one or more processors. The means for carrying out any of the steps described in relation to the system may be a set of one or more processors.

In general, the device of the present invention in any of its embodiments may be at least one processing device. The or a processing device may be a navigation device, whether a portable navigation device (PND) or an integrated device, or may be a server.

Accordingly, in an embodiment, there is provided a portable navigation device, comprising:

one or more processors;

position detection means for determining the position of the navigation device;

a display device;

repository storing digital map data pertaining to a navigable network along which the navigation device can travel, the digital map data including data pertaining to the available lanes of the navigable network; and memory comprising instructions which when executed by one or more of the processors causes the navigation device to:

generate, for display on the display device, a three-dimensional perspective view of a model representative of the map data as though from a camera positioned at an elevation and pitch angle behind a current position of the portable navigation device, that is updated to follow the device as it travels along a planned route, wherein the three-dimensional perspective view shows the available lanes of the navigable network, and wherein the planned route to be followed is shown in the view as a line, the line showing the route to be followed as passing along a determined current lane in which the device is travelling; and adapt the generated view, in response to detecting that the determined current lane in which the device is travelling differs from a lane or lanes associated with a manoeuvre to be made at an upcoming decision point in order to follow the planned route, such that the line showing the route to be followed indicates an instruction to the user to change lanes.

In embodiments, the instruction to change lanes is associated with the manoeuvre to be made at the upcoming decision point, e.g. approaching junction, in order to follow the planned route.

In embodiments, the instruction is provided by the line showing the route to be followed being shaped to indicate to the user that the current lane should be changed before the upcoming decision point, e.g. approaching junction.

The instruction may be shown at a predetermined distance or time from the junction. Alternatively, the instruction may be positioned at the first opportunity to change lanes for the upcoming decision point, e.g. approaching junction.

In embodiments, and in response to a determination that a current lane of the device is changed in accordance with the instruction, the generated view is adapted such that the line showing the route to be followed no longer shows the instruction to the user to change lanes.

In embodiments, the line showing the route to be followed continues to indicate the instruction to the user to change lanes as the movement of the device is followed, until a determination is made that the current lane of the device is changed in accordance with the instruction. The continual indication may be provided by the instruction moving concurrently with the position of the device, until a determination is made that the current lane of the device is changed in accordance with the instruction. In embodiments, once the current position of the device is a predetermined distance before the instruction, the instruction moves concurrently with the position of the device, thereby maintaining the predetermined distance between the position of the device and the instruction, until a determination is made that the current lane of the device is changed in accordance with the instruction.

In embodiments, the available lanes of the navigable network are shown in the three-dimensional perspective view by way of road markings, optionally virtual road markings generated based on data stored in the map database. Preferably, the road markings are only shown in the rendered view on parts of the navigable network relevant to the planned route. Preferably, the road markings are only shown in the rendered view on parts of the navigable network local to the detected position of the device.

In embodiments, the digital map data includes data pertaining to a number of lanes available at least in a section of the navigable network, optionally further comprising data pertaining to the lane indications for manoeuvres at junctions.

In embodiments, the line showing the route to be followed covers all possible lanes that can be occupied to successfully complete the manoeuvre to be made at an approaching junction in order to follow the planned route.

In embodiments, the current lane of the navigable network in which the device is travelling is determined from a data feed received from a lane determination means, which optionally can be separate from the portable navigation device (albeit operatively connected thereto). The current lane of the device may be determined based on data received from one or more of a camera, lidar sensor, radar, GNSS receiver, and an inertial measurement unit.

Any of the methods in accordance with the present invention may be implemented at least partially using software, e.g. computer programs. The present invention thus also extends to a computer program comprising computer readable instructions executable to perform, or to cause a device, e.g. portable navigation device and/or server, to perform a method according to any of the aspects or embodiments of the invention.

The invention correspondingly extends to a computer software carrier comprising such software which, when used to operate a system or apparatus comprising data processing means causes, in conjunction with said data processing means, said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to the method of any of the aspects or embodiments of the invention.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

It will also be appreciated that whilst the provision of a fast forward preview of the upcoming decision point has been discussed in relation to a planned route through the navigable network, it is also envisioned that such functionality may be provided in relation to any decision points that may be encountered during traversal of the navigable network regardless of whether a route has previously been planned or not. For example, if the user is "free-driving", i.e. driving without having first calculated a route to be followed, a fast forward preview may be provided for each upcoming decision point (or only those meeting certain predetermined criteria).

Advantages of these embodiments are set out hereafter, and further details and features of each of these embodiments are defined in the accompanying dependent claims and elsewhere in the following detailed description.

BRIEF DESCRIPTION OF THE FIGURES

Embodiments of the invention will now be described, by way of example only, with reference to the accompanying Figures, in which:

FIG. 3 is a schematic diagram of an arrangement of mounting and/or docking an exemplary navigation device;

FIG. 4A shows an exemplary 2D guidance view as used in conventional navigation devices, and FIG. 4B shows an exemplary 3D guidance view as used in conventional navigation devices (generated using a camera with properties shown in FIG. 4C);

FIGS. 15A and 15B, and FIGS. 16A to 16F, illustrate an exemplary manner of providing lane guidance in accordance with embodiments of the invention.

DETAILED DESCRIPTION OF THE FIGURES

Figure 6A:
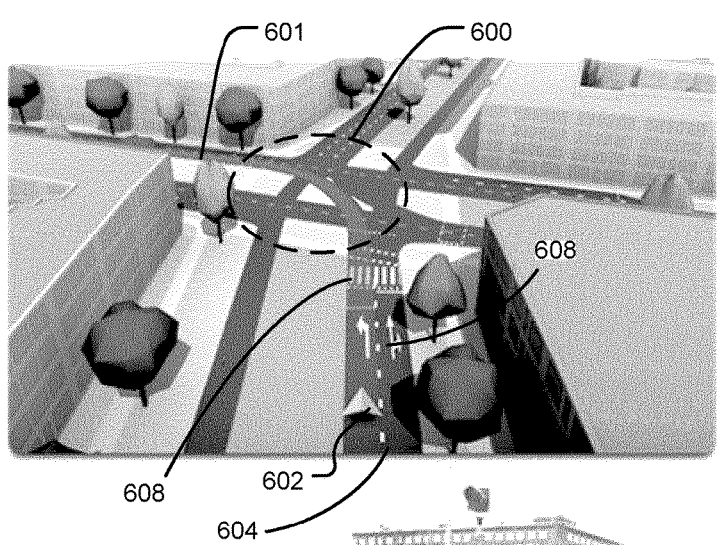
FIG. 6A shows en exemplary view of a junction that is displayed on a display device of a navigation device.
Figure 6B:
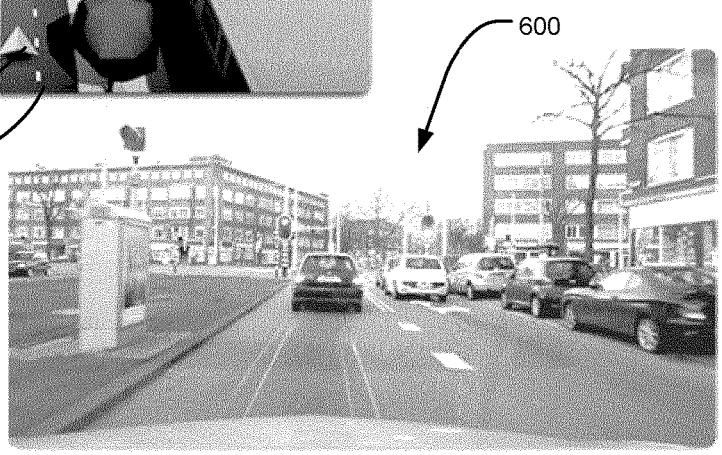
FIG. 6B shows the same junction when viewed by the driver through the windscreen of their vehicle.

It has been recognised that there is a desire to provide a navigation view which provides all the information required by a user in a focussed and straightforward manner, and which is more than just a repetition of what can be seen by the driver simply by looking around them. This is achieved, for example, by generating a realistic view of the area, e.g. road, buildings, etc, around and ahead of the user, and providing additional information to this view such as one or more of certain lane markings, an indication of the route to be followed, an indication of the lanes to be used, road signs, the phase of a traffic control signal. An example of such a view is shown by FIG. 6A in which a user is approaching a complicated junction 600 with multiple roads intersecting. The path to be followed by the user is shown by the line 601, and the current position of the user is shown by the icon 602. The number of lanes on at least the current road is shown through the use of lane dividers 604; with arrows 606 showing the possible manoeuvres that can be made for each lane at the approaching junction 600. The view may also show features such as pedestrian crossings 608 and "right of way" indicators on the current road to provide further information to the user. By comparison the view of the same junction 600 as seen by the driver through the windscreen of their vehicle is shown in FIG. 6B.

Embodiments of the present invention will now be described with particular reference to a Portable Navigation Device (PND). It should be remembered, however, that the teachings of the present invention are not limited to PNDs but are instead universally applicable to any type of processing device that is configured to execute navigation software in a portable manner so as to provide route planning and navigation functionality. It follows therefore that in the context of the present application, a navigation device is intended to include (without limitation) any type of route planning and navigation device, irrespective of whether that device is embodied as a PND, a vehicle such as an automobile, or indeed a portable computing resource, for example a portable personal computer (PC), a mobile telephone or a Personal Digital Assistant (PDA) executing route planning and navigation software.

Further, embodiments of the present invention are described with reference to a road network. It should be realised that the invention may also be applicable to other navigable networks, such as pedestrian paths, rivers, canals, cycle paths or the like.

Figure 1:
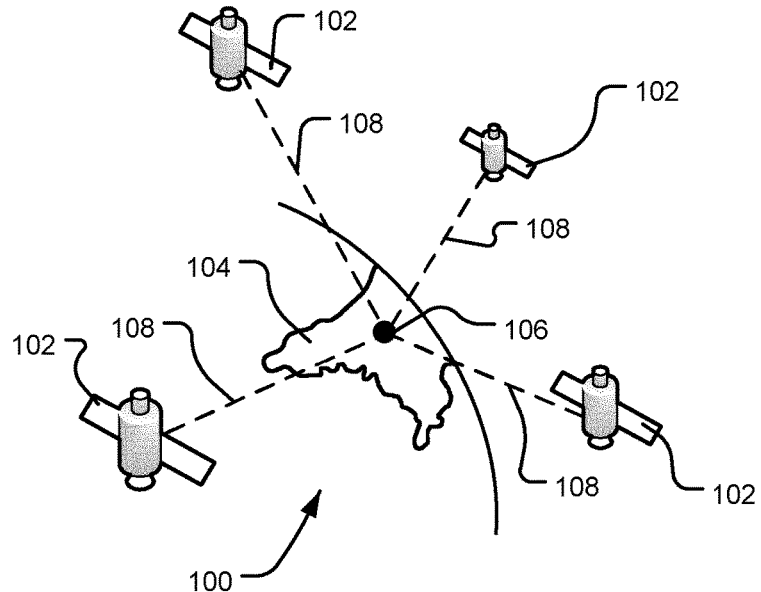
FIG. 1 is a schematic illustration of an exemplary part of a Global Positioning System (GPS) usable by a navigation device.

With the above provisos in mind, the Global Positioning System (GPS) of FIG. 1 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location, as GPS data, to any number of receiving units. However, it will be understood that Global Positioning systems could be used, such as GLOSNASS, the European Galileo positioning system, COMPASS positioning system or IRNSS (Indian Regional Navigational Satellite System).

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives GPS data as spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. The GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

Figure 2:
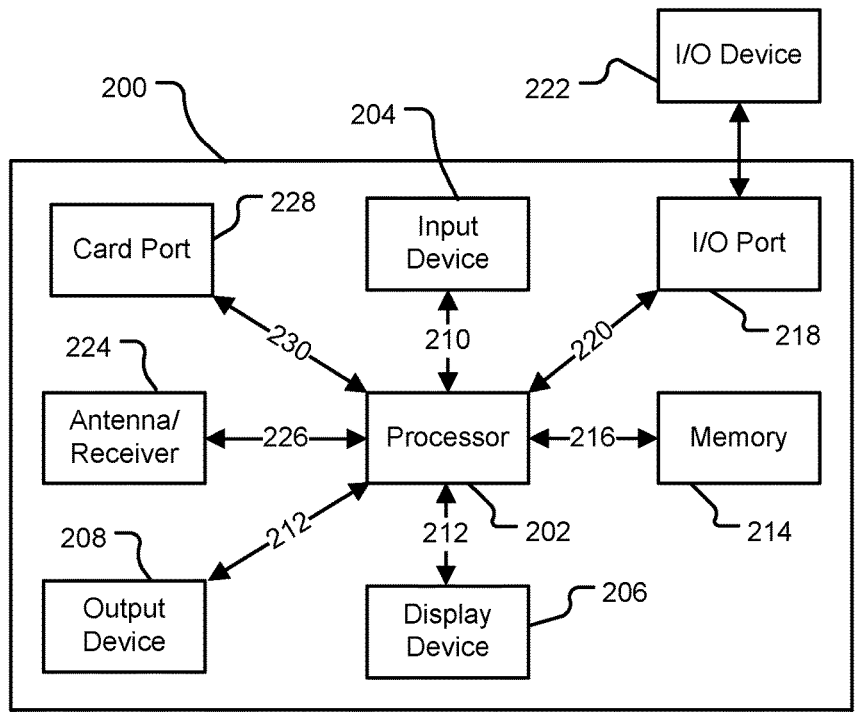
FIG. 2 is a schematic illustration of electronic components of an exemplary navigation device.
Figure 5:
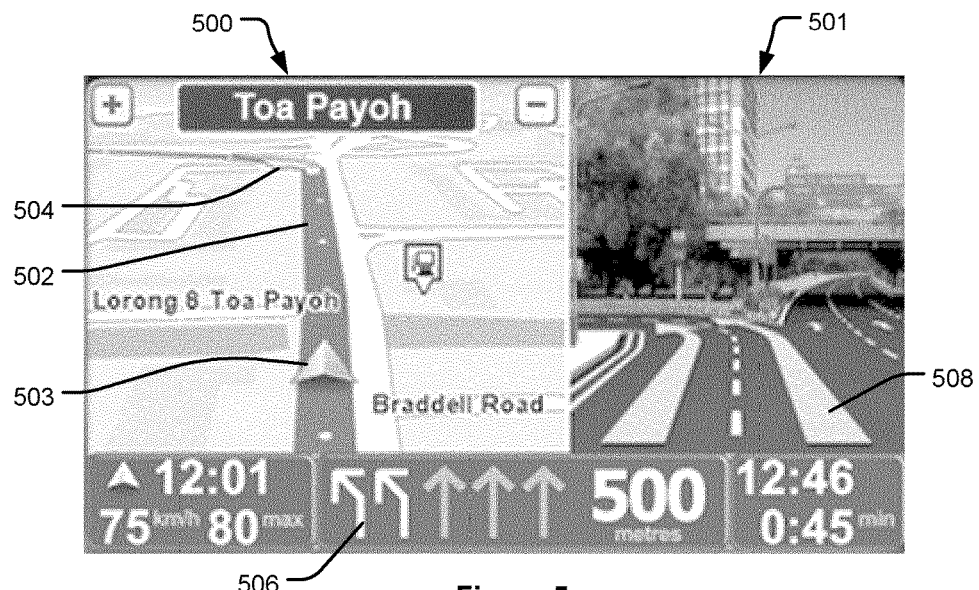
FIG. 5 shows a combination of a 3D guidance view together with a schematic view of an approaching junction that can be used for complex junctions in conventional navigation devices.

An exemplary navigation device 200, e.g. PND, is shown in FIG. 2; it should be noted that the block diagram of the navigation device 200 is not inclusive of all components of the navigation device, but is only representative of many example components. The navigation device 200 is located within a housing (not shown). The navigation device 200 includes processing circuitry comprising, for example, the processor 202 mentioned above, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

In one arrangement, the input device 204 and the display screen 206 are integrated so as to provide an integrated input and display device, including a touchpad or touchscreen input 250 (FIG. 3) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

In the navigation device 200, the processor 202 is operatively connected to and capable of receiving input information from input device 204 via a connection 210, and operatively connected to at least one of the display screen 206 and the output device 208, via respective output connections 212, to output information thereto. The navigation device 200 may include an output device 208, for example an audible output device (e.g. a loudspeaker). As the output device 208 can produce audible information for a user of the navigation device 200, it should equally be understood that input device 204 can include a microphone and software for receiving input voice commands as well. Further, the navigation device 200 can also include any additional input device 204 and/or any additional output device, such as audio input/output devices for example.

The processor 202 is operatively connected to memory 214 via connection 216 and is further adapted to receive/send information from/to input/output (I/O) ports 218 via connection 220, wherein the I/O port 218 is connectible to an I/O device 222 external to the navigation device 200. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish a data connection between the navigation device 200 and the Internet or any other network for example, and/or to establish a connection to a server via the Internet or some other network for example.

The memory 214 of the navigation device 200 comprises a portion of non-volatile memory (for example to store program code) and a portion of volatile memory (for example to store data as the program code is executed). The navigation device also comprises a port 228, which communicates with the processor 202 via connection 230, to allow a removable memory card (commonly referred to as a card) to be added to the device 200.

FIG. 2 further illustrates an operative connection between the processor 202 and an antenna/receiver 224 via connection 226, wherein the antenna/receiver 224 can be a GPS antenna/receiver for example and as such would function as the GPS receiver 106 of FIG. 1. It should be understood that the antenna and receiver designated by reference numeral 224 are combined schematically for illustration, but that the antenna and receiver may be separately located components, and that the antenna may be a GPS patch antenna or helical antenna for example.

It will, of course, be understood by one of ordinary skill in the art that the electronic components shown in FIG. 2 are powered by one or more power sources (not shown) in a conventional manner. Such power sources may include an internal battery and/or a input for a low voltage DC supply or any other suitable arrangement. As will be understood by one of ordinary skill in the art, different configurations of the components shown in FIG. 2 are contemplated. For example, the components shown in FIG. 2 may be in communication with one another via wired and/or wireless connections and the like. Thus, the navigation device 200 described herein can be a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use. Indeed, in other embodiments, the device 200 may be arranged to be handheld to allow for navigation of a user.

Referring to FIG. 3, the navigation device 200 may be a unit that includes the integrated input and display device 206 and the other components of FIG. 2 (including, but not limited to, the internal GPS receiver 224, the processor 202, a power supply (not shown), memory systems 214, etc.). The navigation device 200 may sit on an arm 252, which itself may be secured to a vehicle dashboard/window/etc. using a suction cup 254. This arm 252 is one example of a docking station to which the navigation device 200 can be docked. The navigation device 200 can be docked or otherwise connected to the arm 252 of the docking station by snap connecting the navigation device 200 to the arm 252 for example. The navigation device 200 may then be rotatable on the arm 252. To release the connection between the navigation device 200 and the docking station, a button (not shown) on the navigation device 200 may be pressed, for example. Other equally suitable arrangements for coupling and decoupling the navigation device 200 to a docking station are well known to persons of ordinary skill in the art.

Various embodiments of the new guidance view of the present invention will now be described with reference to FIGS. 7 to 15.

Figure 7:
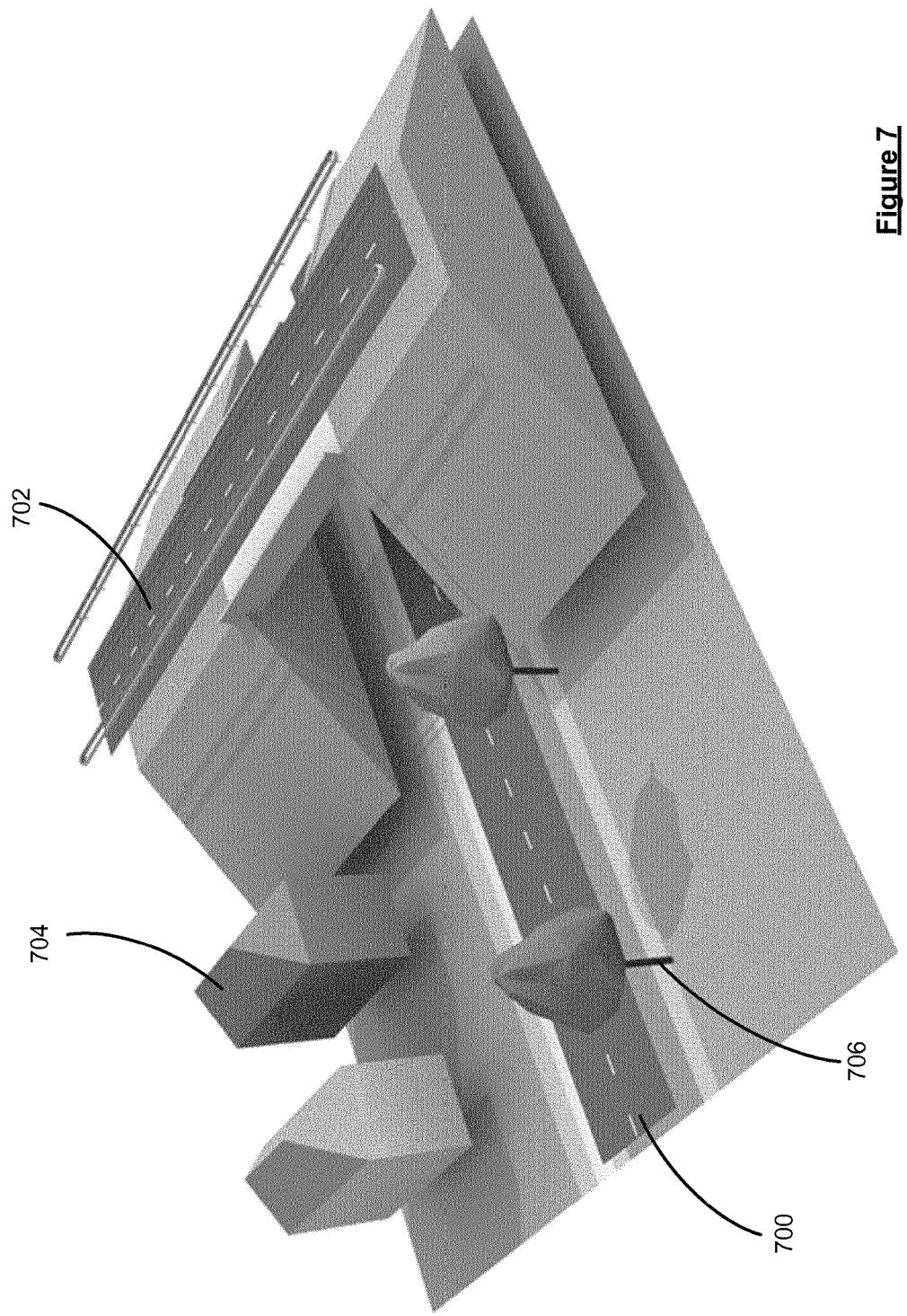
FIG. 7 shows an example of various components used to create a 3D guidance view in accordance with embodiments of the invention.

FIG. 7 shows an example of the various components that may be used to create the 3D guidance view, e.g. roads 700 and 702, buildings and landmarks 704, and trees and other greenery 706. The location, geometry, elevation and other information such as number of lanes, etc for roads 700 and 702 are taken from map data, which is preferably stored on the device. Similarly, the appearance and location of buildings and landmarks 704 is also taken from map data, again that is preferably stored on the device. The appearance of trees and other greenery 706 is generated from models again preferably stored on the device. Such objects are placed in suitable areas as indicated by the map data, e.g. rural or non-urban areas. The location of such objects is preferably random rather than reflecting the actual location of such objects in reality.

In an embodiment of the invention, the user is shown a preview of an approaching junction by the position of the camera advancing along the predetermined route. As will be appreciated, the advancement of the camera is performed such that the current position of the device can no longer be seen in the navigation view. In other words, the camera fast-forwards along the path being traveled to preview an upcoming decision point, e.g. junction, intersection, etc. In embodiments the elevation and/or pitch angle of the camera is also changed, with in preferred embodiments, the camera moving to a smaller elevation and a greater pitch angle than is used for normal guidance.

An example of this functionality is illustrated in FIGS. 8A to 8J. In these figures, a vehicle (with a navigation device) is travelling from an origin 800 to a destination 802 along the schematic path 803. The current position of the vehicle along the path 803 is shown by the marker 804, and by the icon 806 in the guidance view 805.

Figure 8A:
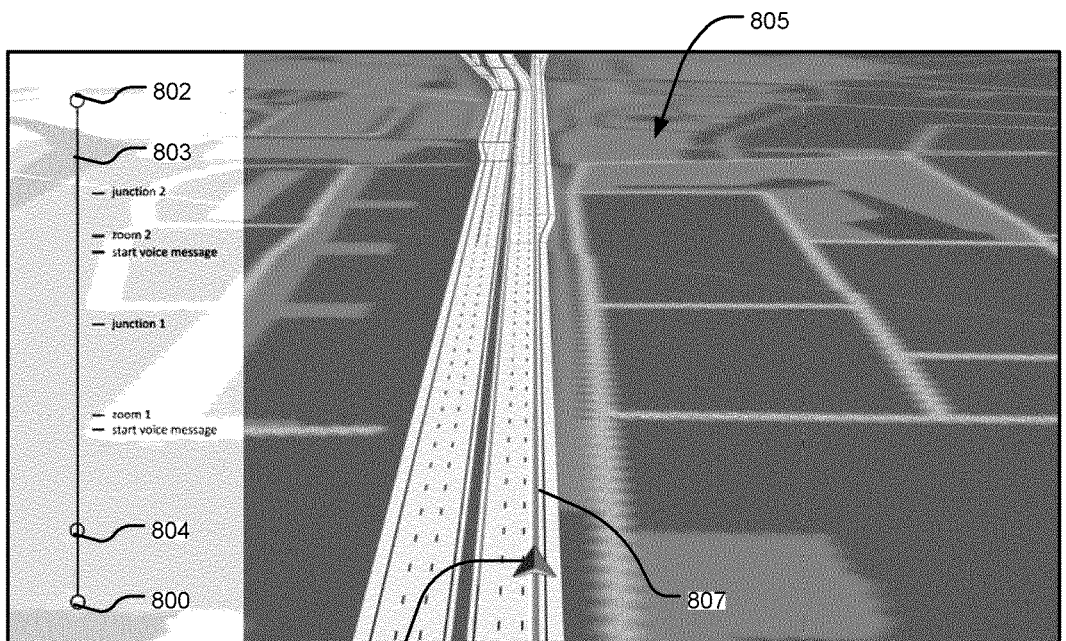
FIGS. 8A to 8J show a fast forward preview of an approaching junction in accordance with embodiments of the invention.

In FIG. 8A, the vehicle is shown travelling in the outer lane of the road along the predetermined path 807. FIG. 8A shows the camera in its usual guidance position, with the camera being located at a first elevation and pitch angle. The pitch angle in this example being 30°, although it will be appreciated that any angle, such as between 20° to 40°, may be used as desired.

Figure 8B:
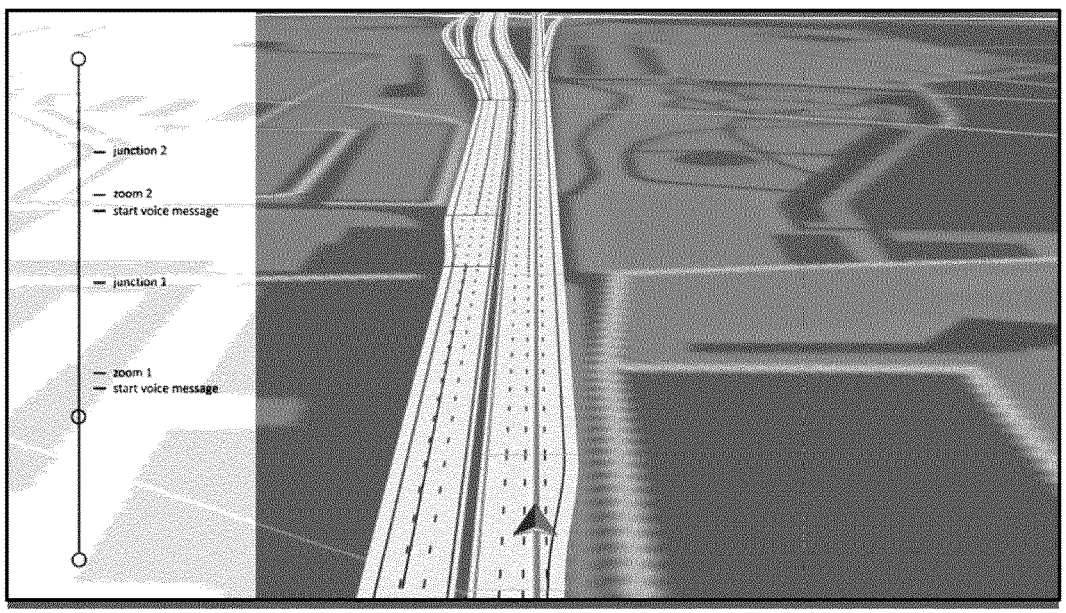
Figure 8C:
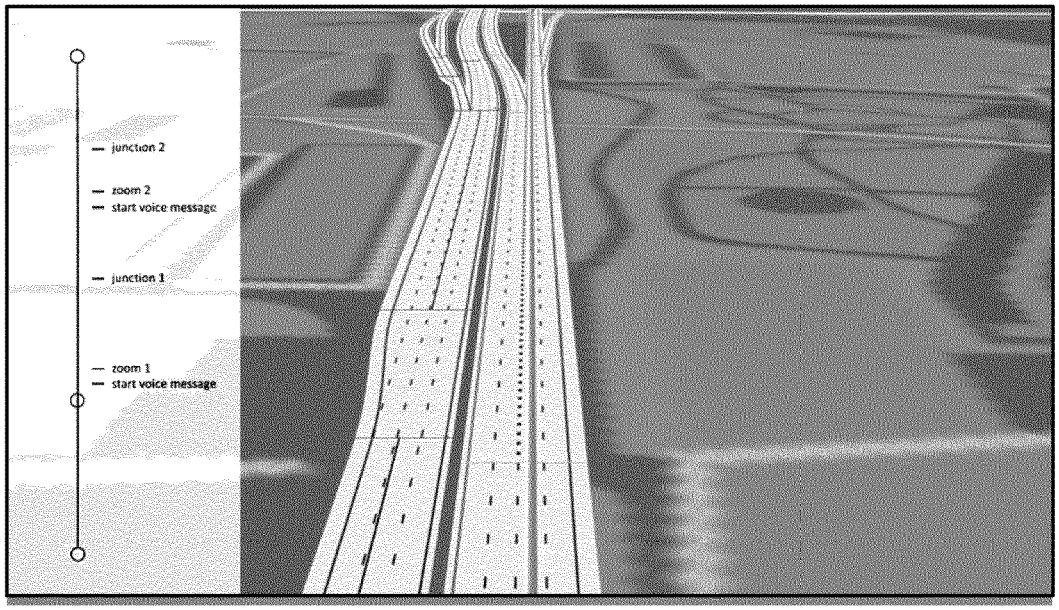

FIG. 8B shows the vehicle having advanced along the path 807 to a point a predetermined distance in front of "junction 1". The predetermined distance may be based on the type of road currently being traveled, e.g. highway, major road, minor road etc, environmental factors, a profile of the driver or the like. When the device (and thus vehicle) reaches this point, the camera will stop its concurrent movement with that of the vehicle (i.e. tracking the current position of the device), and begin to advance along the predetermined path towards the junction, at least by moving in the x-y plane. The camera may also decrease in elevation and/or increase in pitch angle as it advances towards the junction. This movement can best be seen by the change in view between FIG. 8B (start of the transition) and FIG. 8C (middle of the transition) and FIG. 8D (end of the transition).

An audible message warning the user may the approaching junction may also be issued, e.g. at the same time as the advancement of the camera. For example, in the embodiment shown, the audible message is delivered to the user when the device reaches the point denoted "start voice message" on path 803.

Figure 8D:
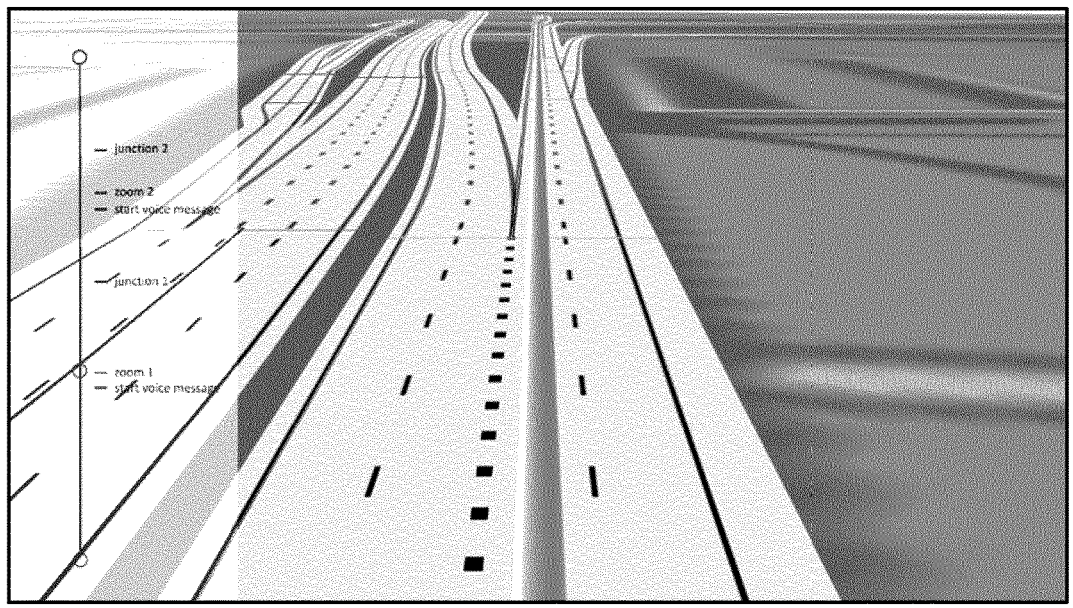

In FIG. 8D, the camera has reached a predetermined position associated with the junction, such that the user is able to see details about the upcoming junction. This predetermined position is denoted as point "zoom 1" on the schematic path 803. As will be seen, the user is now able to clearly see the geometry of the junction, the manoeuvre to be made at the junction and the desired choice of lane. As seen in FIG. 8D, the camera has a larger pitch angle when in this position; preferably between 50° and 70°, and most preferably 60°.

Figure 8E:
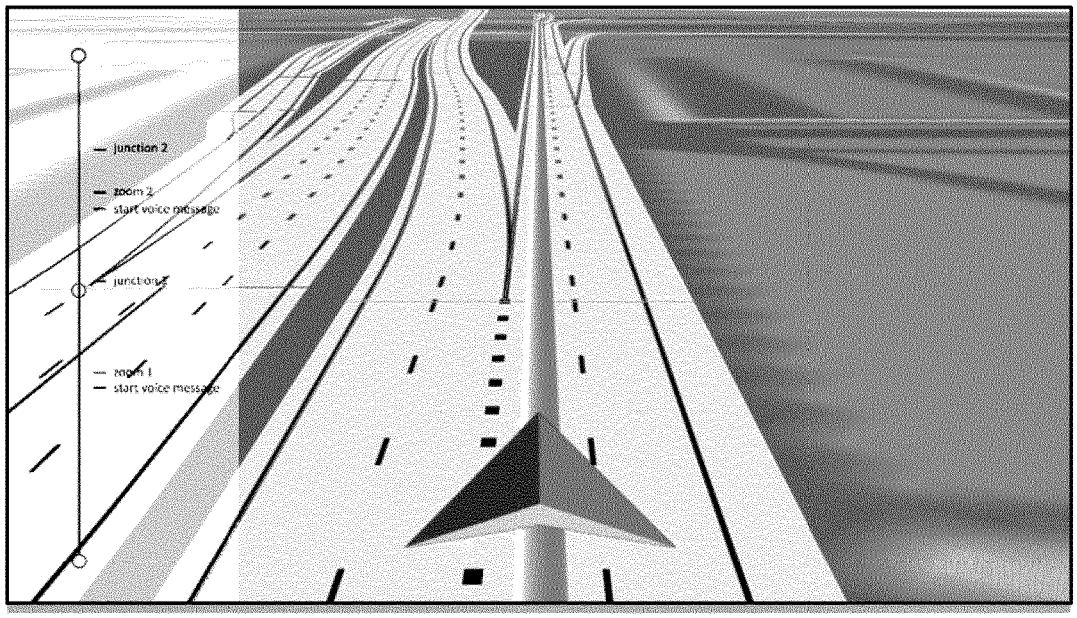
Figure 8F:
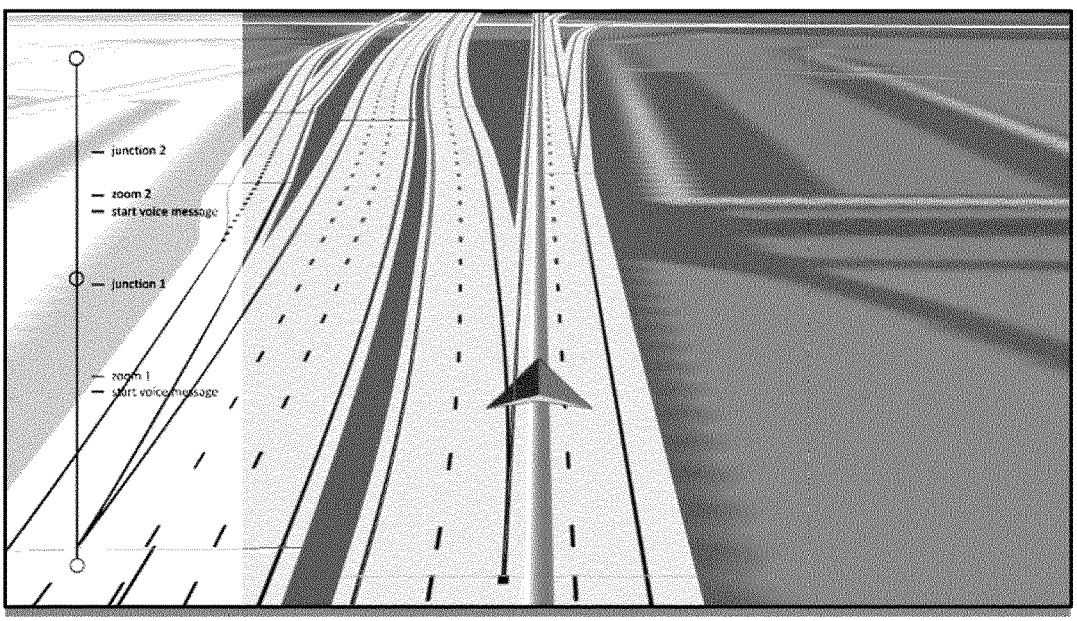
Figure 8G:
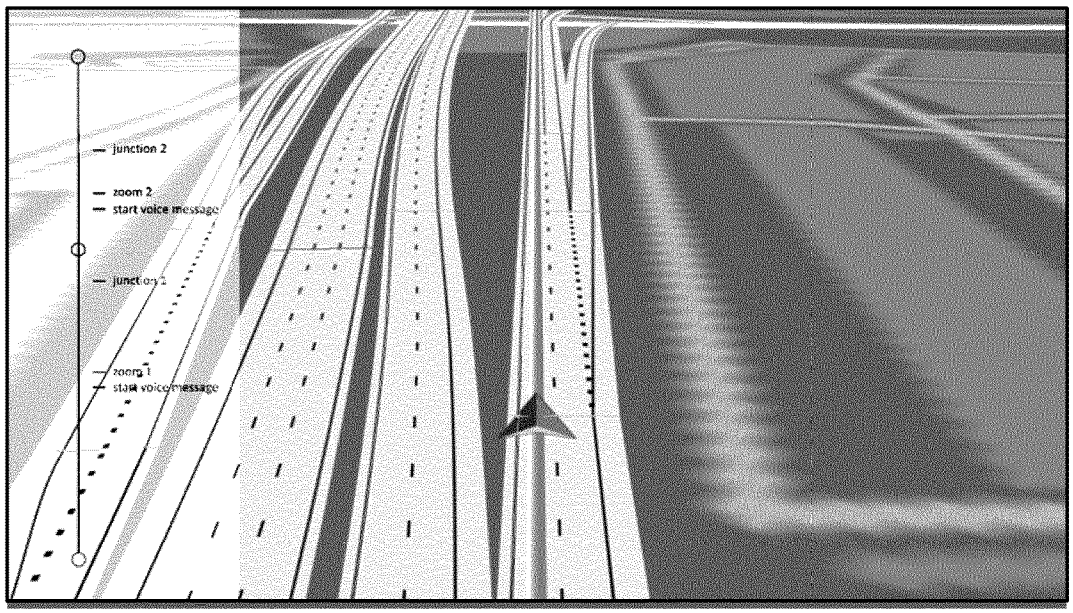
Figure 8H:
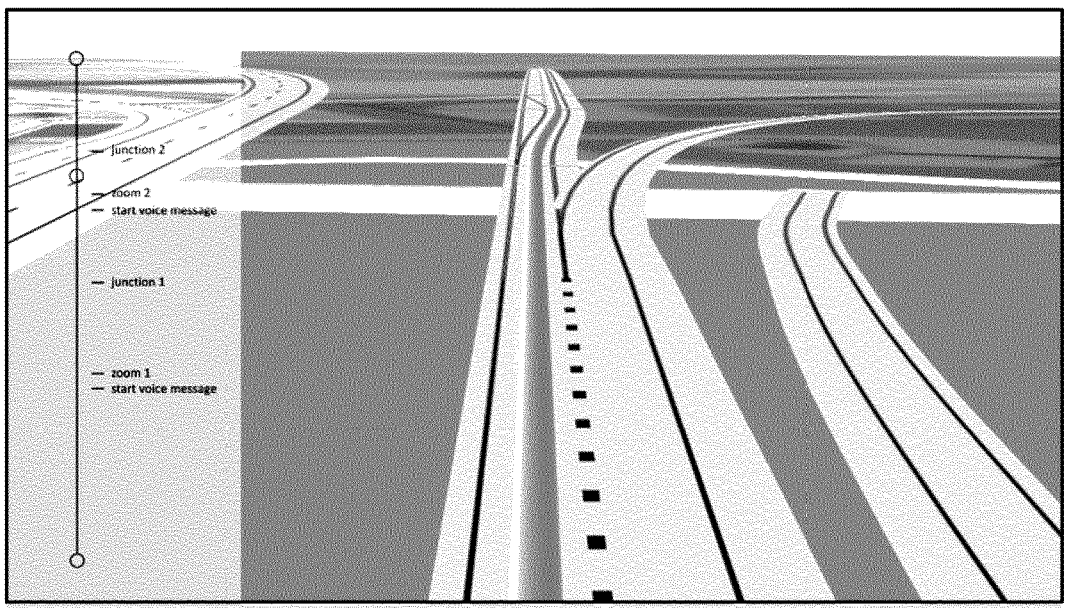
Figure 8I:
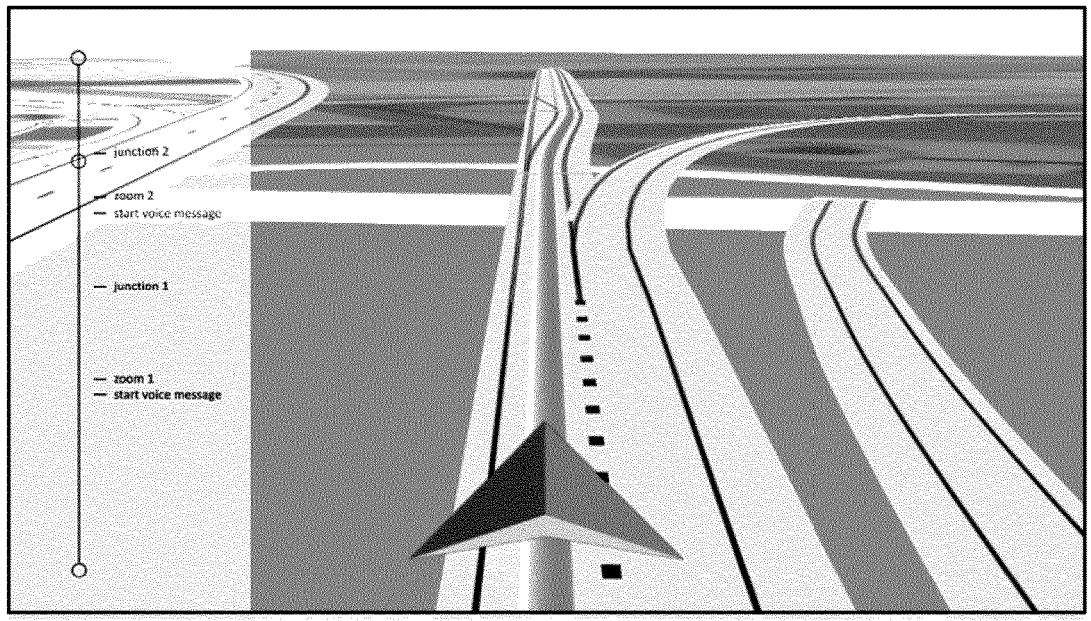
Figure 8J:
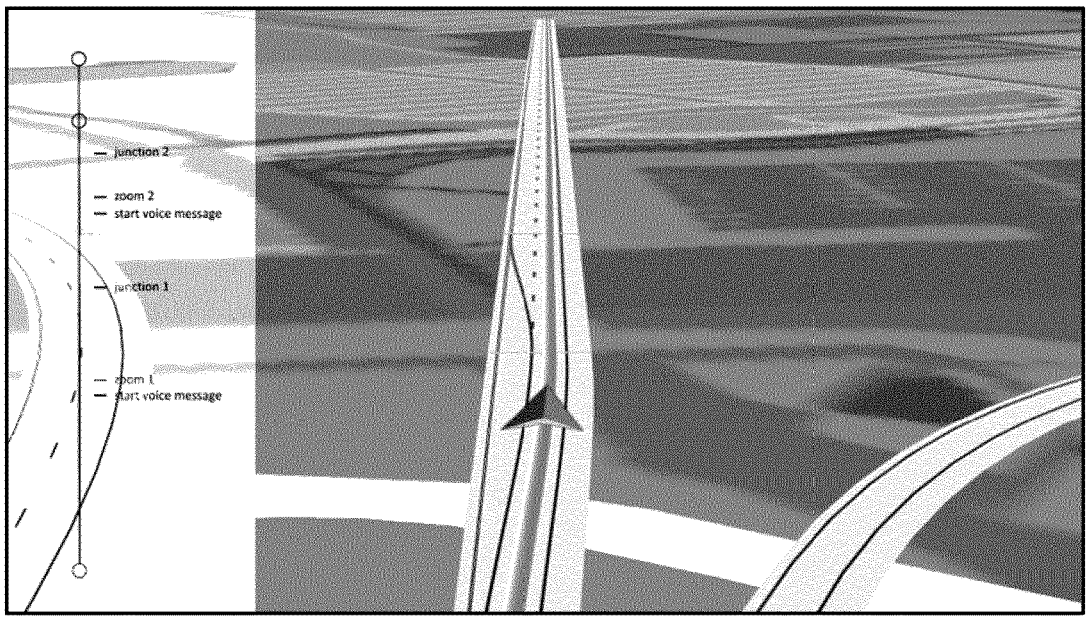

The camera stays in this position until the current position of the device (which has continued to move towards the junction during this time) reaches the start of the junction. This is shown in FIG. 8E wherein the icon 806 representative of the current position of the device has just come back into view on the screen. Once the device reaches the junction, the camera begins to transition back to its normal position tracking the movements of the device, e.g. by raising in elevation and reducing the pitch angle. This movement can best be seen by the change in view between FIG. 8F and FIG. 8G. in preferred embodiments this transition involves an increase in elevation of the camera position (to the original elevation) and a reduction of pitch angle (to the original pitch angle).

FIGS. 8G to 8J show a similar set of camera transitions in respect of "junction 2" with the camera fast forwarding to preview the junction between the points denoted "start voice message" and "zoom 2" on the schematic path 803, and reverting back to the normal guidance position after the vehicle has passed the beginning of the junction denoted by "junction 2" on the schematic path 803.

Figure 9:
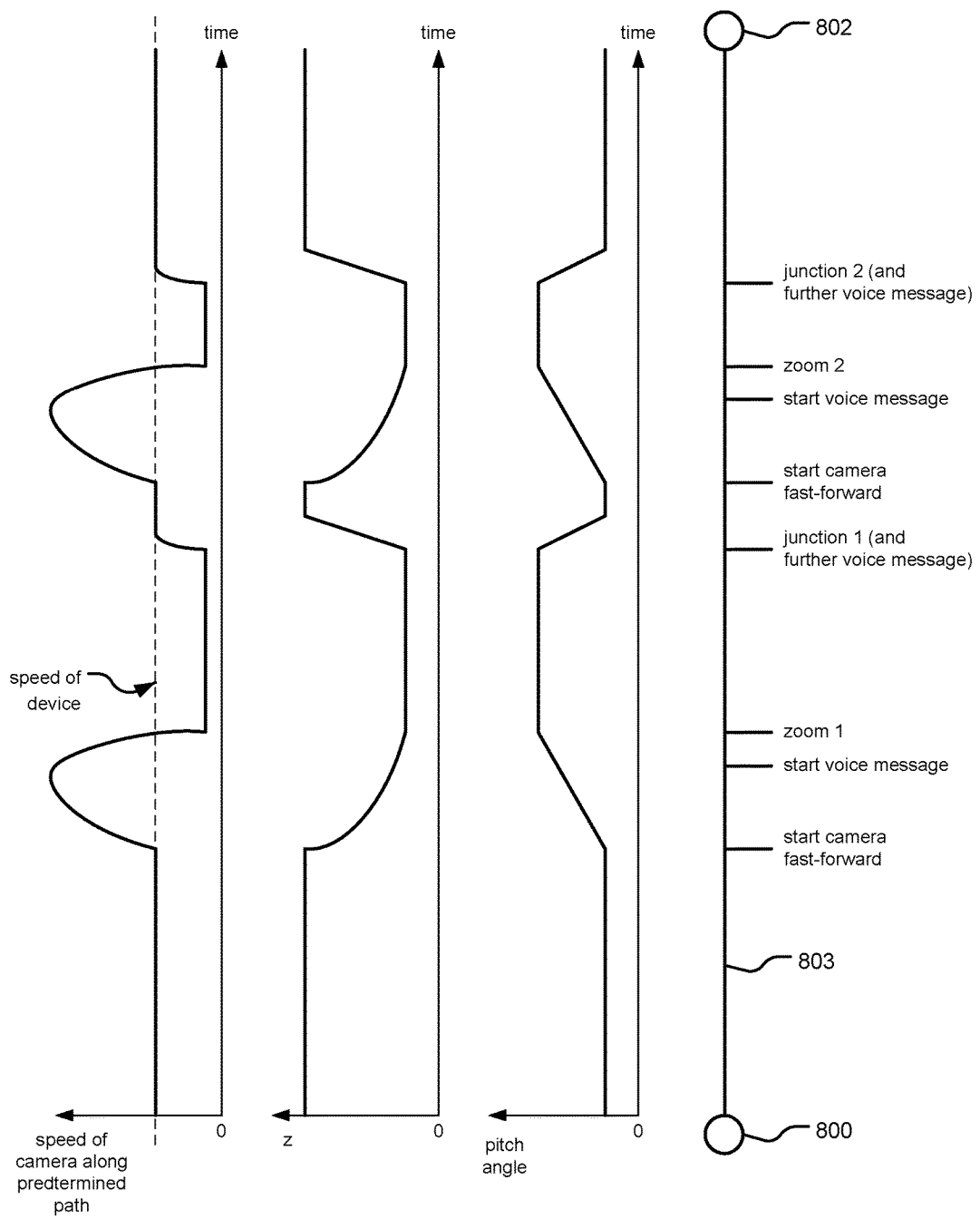
FIG. 9 shows the changes in speed, elevation and pitch angle of the camera when performing the fast forward preview of FIGS. 8A to 8J.

FIG. 9 depicts how (i) the speed of the camera along the calculated route, (ii) the camera elevation, and (iii) the pitch angle of the camera changes will time as the device (and associated vehicle) travels along the path 803.

For example, it can be seen that the pitch angle increases, e.g. from around 30° to 60°, as the junction is approached. The camera stays at this pitch angle until the device reaches the junction, at which time the pitch angle quickly decreases back to its original value, e.g. of 30°. Preferably the increase in pitch angle occurs over a longer time period than the reversion of the pitch angle back to its original value; this emphasises the fast-forward movement of the camera. While the change in pitch angle is shown as occurring linearly with time, it will be appreciated that the change may occur in a non-linear manner.

Similarly, it can be seen that the elevation of the camera decreases as the junction is approached. The camera stays at this elevation until the device reaches the junction, at which time the camera increases in elevation to return to its original height. Preferably the decrease in elevation occurs over a longer time period than the increase in elevation back to its original value; this emphasises the fast-forward movement of the camera. While the decrease in elevation is shown as occurring non-linearly, and the subsequent increase in elevation is shown as occurring linearly, it will be appreciated that either transition may occur in any desired manner, e.g. linearly or non-linearly.

It can be also been seen in FIG. 9 that the speed of the camera along the path 803 increases rapidly to "fast-forward" the camera ahead of the device, and thus preview an approaching junction, before dropping to a speed slower than the current vehicle speed (to allow the device to catch-up). As will be appreciated, the speed of the camera when in its "zoomed" position may be zero or a non-zero value (e.g. as shown in FIG. 9) as desired provided it is less than the current speed of the device. This speed may be a predetermined speed, or it may be based on the current speed of the device. The changes in speed of the camera may be chosen as desired to provide a desired user experience; thus it will be appreciated that the changes shown in FIG. 9 are merely exemplary.

Figure 10A:
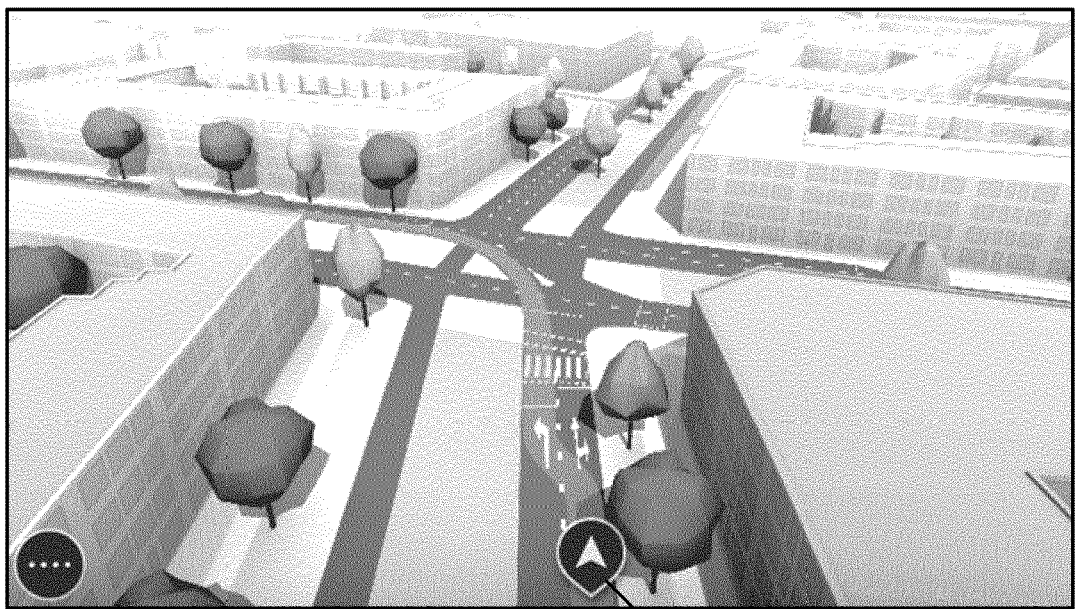
FIGS. 10A and 10B show embodiments of the guidance view in which graphical icons can be selected to initiate or cancel a fast forward preview.
Figure 10B:
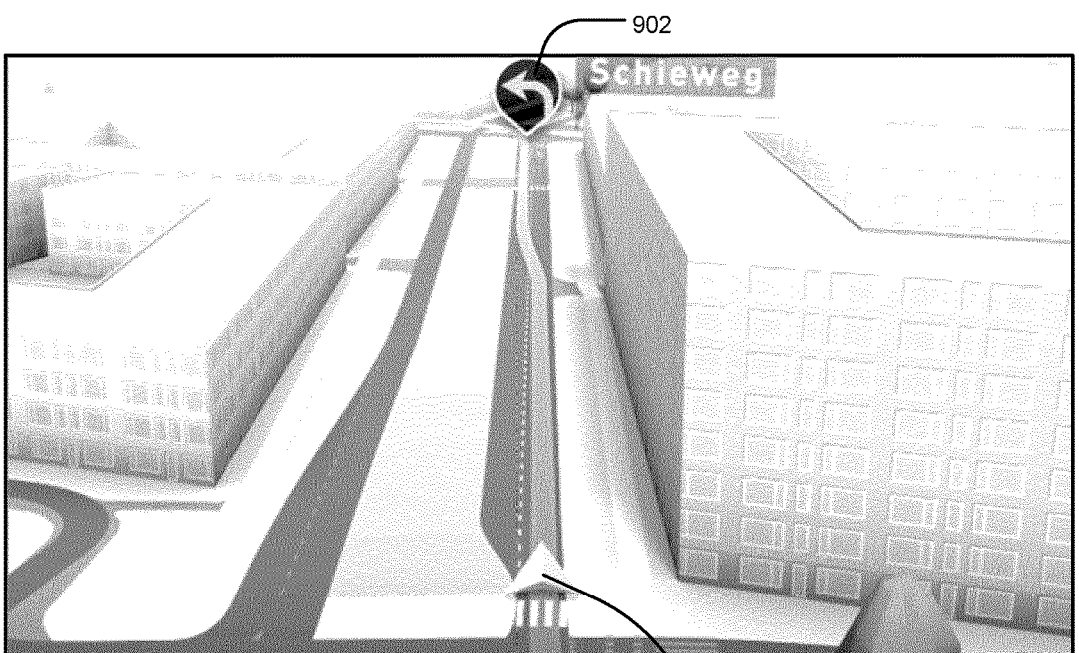

Typically, the camera will stay in the zoomed position until the device reaches the junction. It will be appreciated, however, that, for example due to traffic congestion, the device may be delayed in reaching the junction. The camera may therefore perform a reverse manoeuvre or other type of transition back to the current position of the device (and the original camera settings used to track the movements of the device) if the vehicle speed drops below a certain speed or the camera is in a zoomed position for more than a predetermined period of time. In other words, in some embodiments, the camera may automatically move back to show the current position of the device FIGS. 10A and 10B illustrate a further embodiment in which the camera moves back to show the current position of the device based on user input. In FIG. 10A, a selectable option is provided to the user, e.g. the selectable icon 900, which when selected moves the camera back to see his own position again, e.g. as shown in FIG. 10B (the current position of the device being shown by the icon 904). A further selectable option may also be provided to the user, e.g. the selectable icon 902 of FIG. 10B, which will cause the camera to again fast-forward to the junction. Therefore, in embodiments, the camera can be made to fast-forward to preview an approaching decision point based on user input.

Other aspects of the present invention will now be described, which can be used separately from, or in combination with, the above described fast-forwarding camera functionality. Each of the following aspects can also be used separately, or in any combination as desired.

Figure 11:
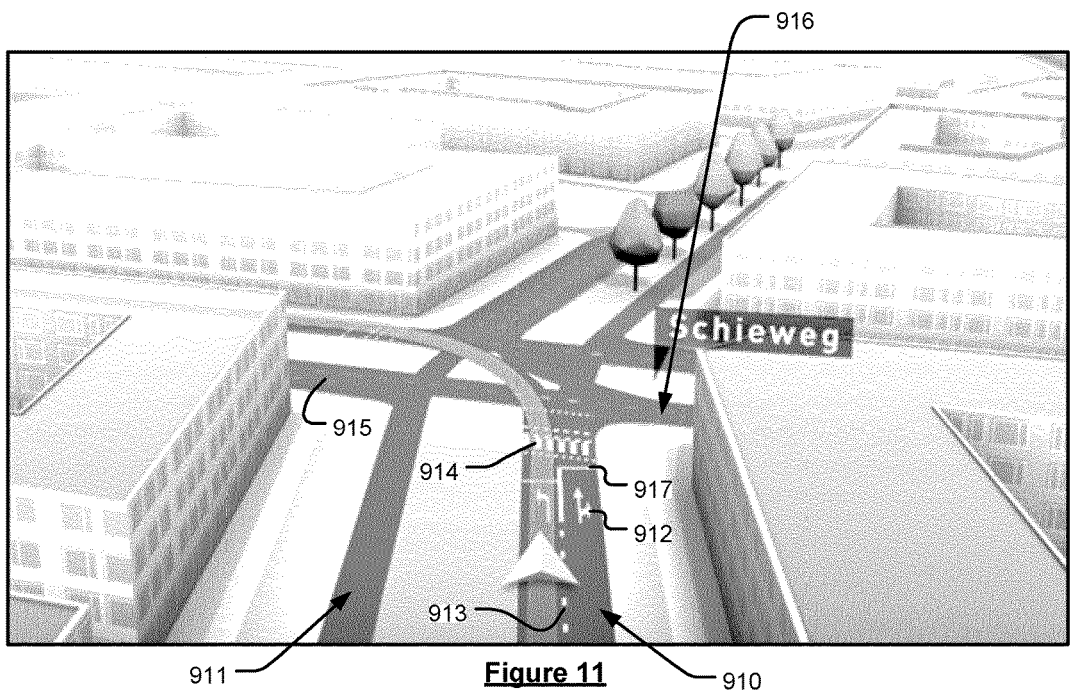
FIG. 11 illustrates an embodiment of the guidance view in which distinctions are made between more and less relevant roads.

FIG. 11 illustrates an embodiment of the guidance view in which distinctions are made between more and less relevant roads. A focus is preferably put on the road currently being traveled, therefore limiting the distraction of the user by other roads also on the screen. For example, road markings are not shown on roads that the user is not able to enter, e.g. road 911, from their current road 910. For roads that the user can enter from their current position, e.g. road 916, road markings are shown for a predetermined distance from the junction and are then faded out. Road markings can include lane dividers 913, pedestrian crossings 914, arrows 912, stop lines 917, etc.

In embodiments, some road markings, such as the arrows 912 shown in FIG. 11, are not shown in a position illustrative of their real-world location. For example, the arrows 912 are always shown just before the junction such that they are always shown in the junction preview. The arrows are also only shown once on the road unlike reality in which typically they are shown multiple times on a road.

Figure 12:
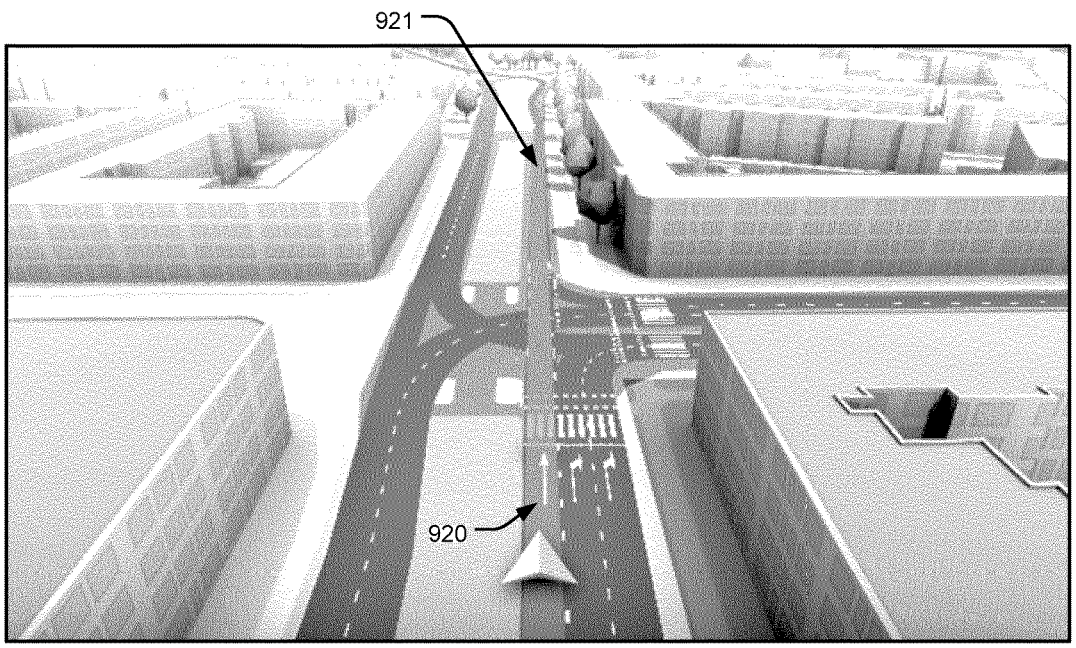
FIG. 12 illustrates an embodiment of the guidance view in which the transparency of the displayed calculated route being followed is varied.

FIG. 12 illustrates an embodiment of the guidance view of the invention in which the transparency of the displayed calculated route being followed by the user is varied. For example, as shown in FIG. 12, the portion of the route 920 around the current position of the device (i.e. at the bottom of the screen) is shown in a semi-transparent manner, e.g. such that the road markings are visible. This portion of the route may be a predetermined distance in front of and behind the current position. Conversely, the portion of the route that is more than a predetermined distance in front of the current position, or a predetermined distance after the approaching junction, is shown in an opaque manner.

Figure 13:
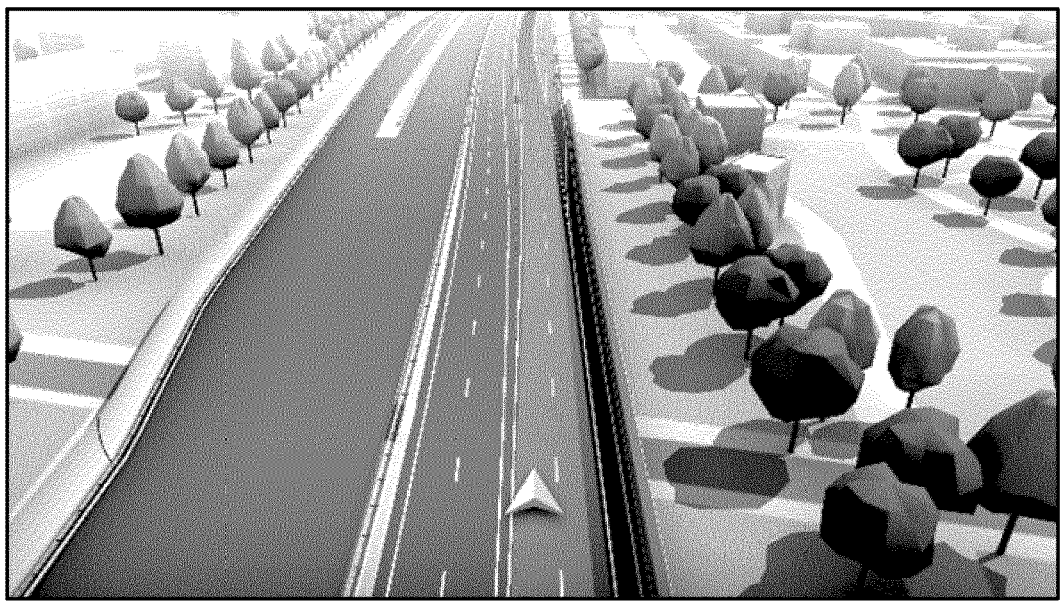
FIG. 13 illustrates an embodiment of the guidance view in which the displayed route encompasses any lane that the user is able to travel.

In embodiments, as shown in FIG. 13, the displayed route may encompass any lane that the user is able to travel in along the calculated route, rather than just the current lane in which they are travelling.

Figure 14A:
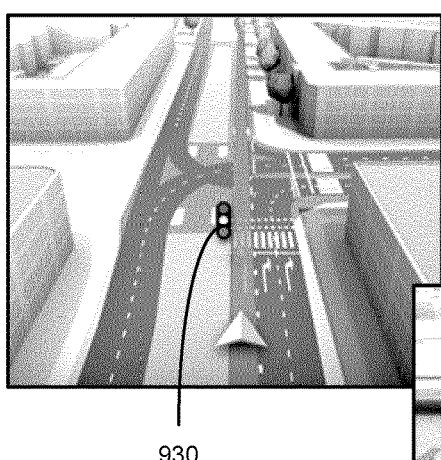
FIGS. 14A and 14B illustrate an embodiment of the guidance view in which the view is supplemented with additional information
Figure 14B:
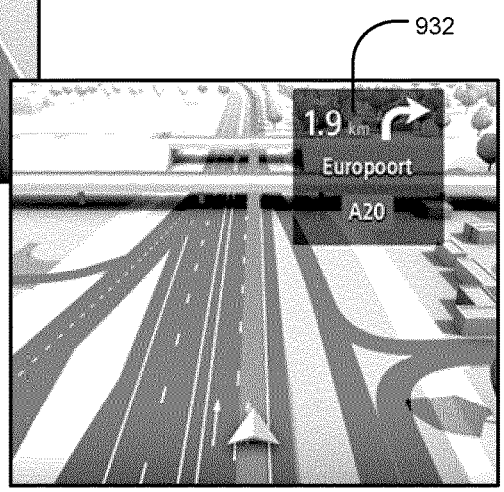

In embodiments, as shown in FIGS. 14A and 14B, the guidance view may be supplemented with additional information, e.g. an icon 930 indicating the phase of an approaching traffic control signal, an road sign 932, etc.

In embodiments, the guidance view can be used to advise a user to switch lanes. As will be appreciated, it is in important in at least these embodiments to ascertain in which lane a user a currently travelling. This may be determined only using information obtained from the global navigation satellite system (GNSS) receiver, but may be supplemented by using information from a camera, laser or other imaging sensor associated with the device to more accurately determine the location of the device. For example, substantial research has been carried out in recent years, in which image data from one or more video cameras mounted within a vehicle is analysed, e.g. using various image processing techniques, to detect and track the lane in which the vehicle is travelling. In preferred embodiments, the positioning information obtained from the GNSS receiver, and optionally one or more image sensors, is used together with map data indicating the number of lanes, geographic position and geometry to display lane guidance information to a user. For example, the current lane in which a vehicle is travelling in a multi-lane carriageway can be determined, for example, using the method set out in the paper "Multi-lane detection in urban driving environments using conditional random fields" authored by Junhwa Hur, Seung-Nam Kang, and Seung-Woo Seo. published in the proceedings of the Intelligent Vehicles Symposium, page 1297-1302. IEEE, (2013). Here, the portable navigation device may be provided with a data feed from a video camera, radar and/or lidar sensor and an appropriate algorithm is used to process the received data in real-time to determine a current lane of the device or the vehicle in which the device is travelling. Alternatively, another device or apparatus, separate from the portable navigation device, such as a Mobileye system available from Mobileye N.V. may provide the determination of the current lane of the vehicle on the basis of these data feeds and then feed the determination of the current lane to the portable navigation device, for example by a wired connection or a Bluetooth connection.

Figure 15A:
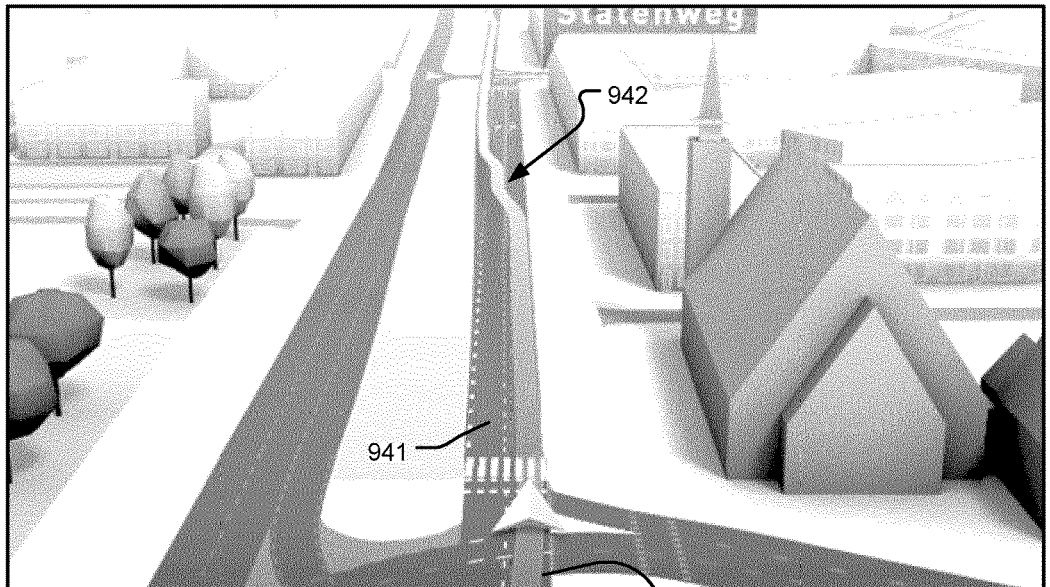
Figure 15B:
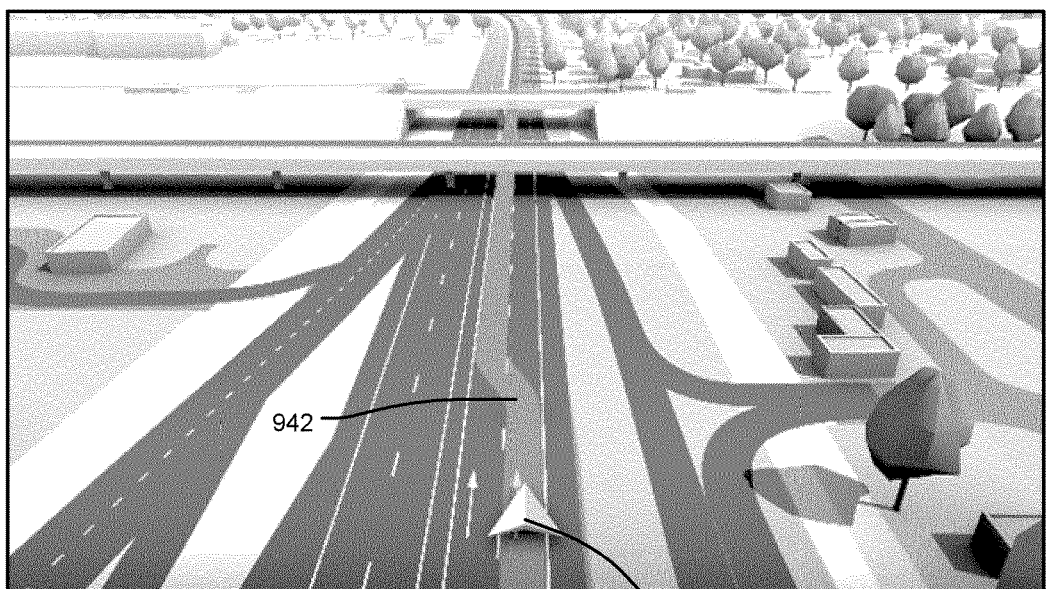

For example, as shown in FIG. 15A, a user is advised to switch from current lane 940 to another lane 941 by a transition, e.g. curved, portion 942 in the displayed route. If the user does not follow this instruction to switch lanes, the transition, e.g. curved, portion moves forward along the current road toward the current position of the user (e.g. as shown by icon 944). This is shown, for example, by FIG. 15B.

Another example for providing lane guidance to a user will now be described with reference to FIGS. 16A to 16F.

Figure 16A:
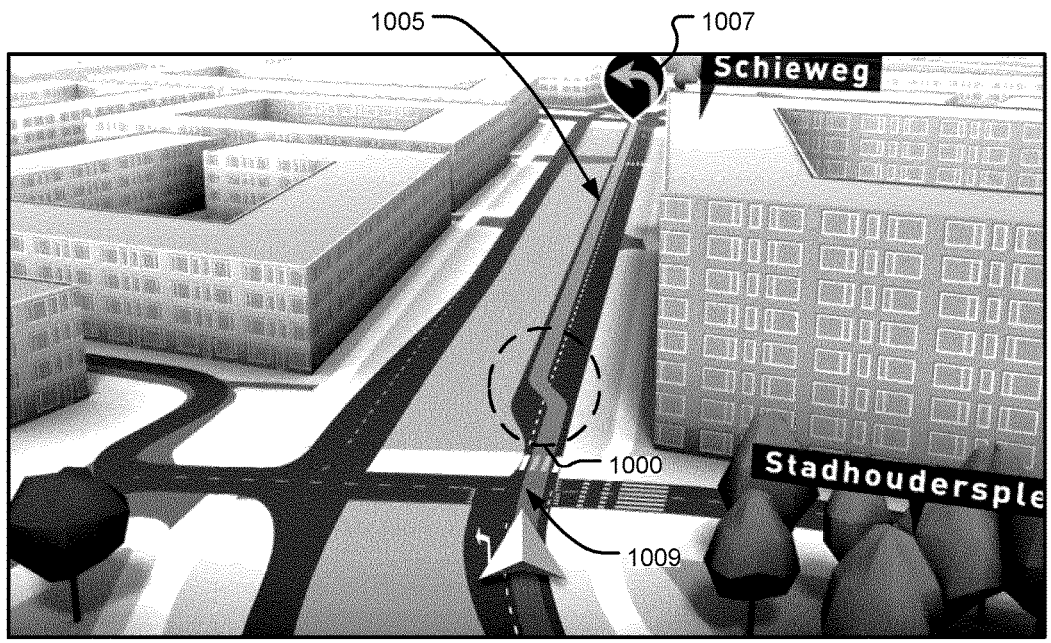

In FIG. 16A, a user, indicated by the icon 1006, is shown following a predetermined route 1005, which includes an instruction 1000 to change lanes after junction 1009 from lane 1004 to lane 1002. Preferably, the instruction to change lanes is associated with a manoeuvre to be made at an approaching junction, indicated by the icon 1007. The instruction 1000 can be shown at a predetermined distance or time from the junction, or, for example, may be positioned at the first opportunity to change lanes for the approaching junction; in this case after junction 1009.

Figure 16B:
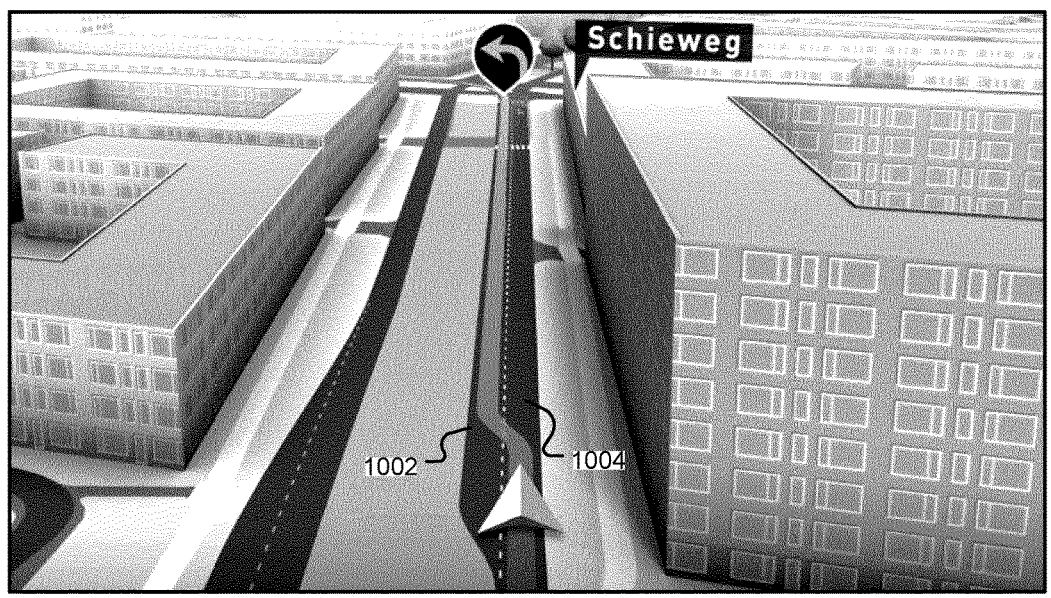
Figure 16C:

In FIG. 16B, the user is shown having progressed along the route 1005, and is soon to reach the position along the route at which the lane change instruction 1000 is associated. The user may change lanes as soon as instructed; however in many cases the user will choose not to, or be unable to (e.g. due to traffic on the road), switch lanes when instructed. In such cases, the instruction 1000 is arranged to move concurrently along the route with the user, e.g. as shown in FIG. 16C. The concurrent movement of the current position icon 1006 and the lane change instruction 1000 begins when the user is a predetermined distance before the instruction 1000; the concurrent movement thereby maintaining the predetermined distance between the position icon 1006 and the instruction 1000. The combined movement of the current position icon 1006 and lane change instruction 1000 on the display preferably continues until the user makes the switch in lane (or, for example, until the camera moves to preview the approaching junction).

Figure 16D:
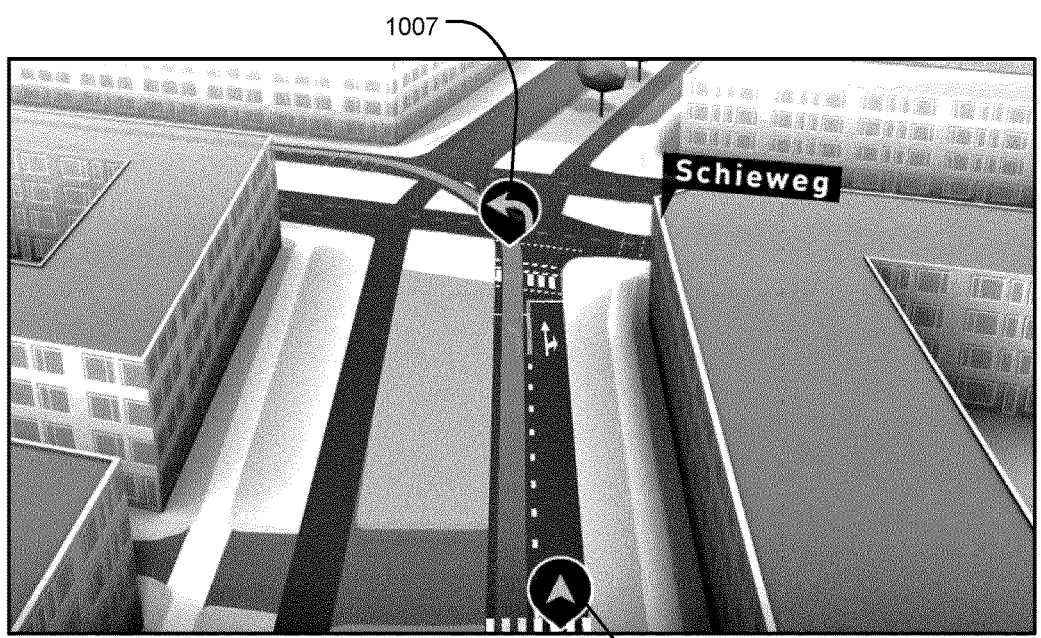

In FIG. 16D, the camera has begun its fast-forward movement to preview the manoeuvre 1007 to be made at the approaching junction. The current position of the user is shown by icon 1008, which remains in lane 1004 thereby indicating that the user has still to change lanes.

FIG. 16E shows a later time, although still prior to the user having arrived at the approaching junction, where the icon 1008 indicating the current position of the user is now shown in lane 1002. The user has therefore now changed lanes according to the instruction 1000, as required for the manoeuvre 1007 at the junction.

Figure 16F:
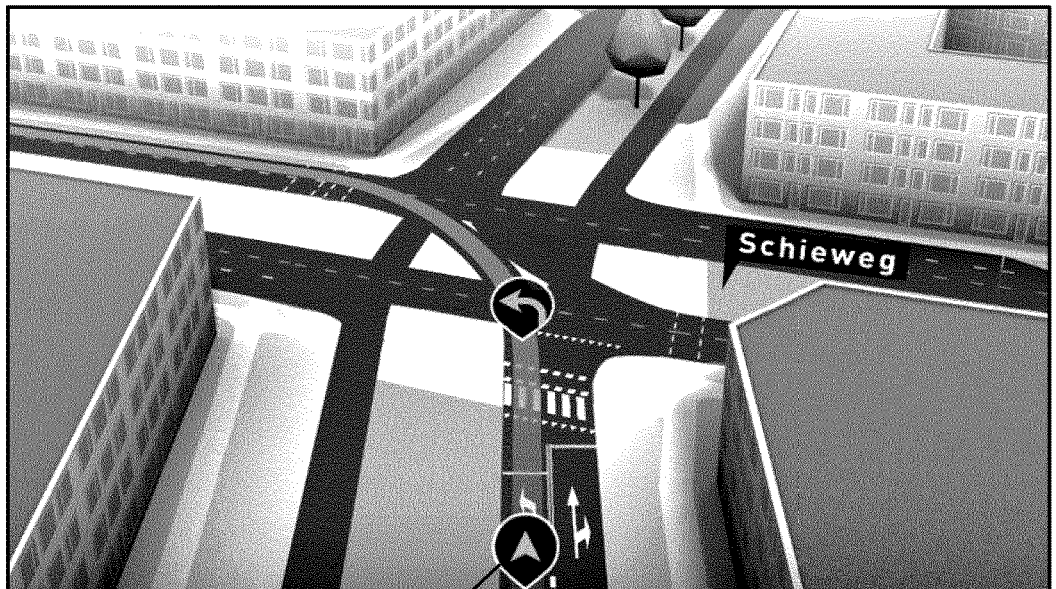
Figure 16F:
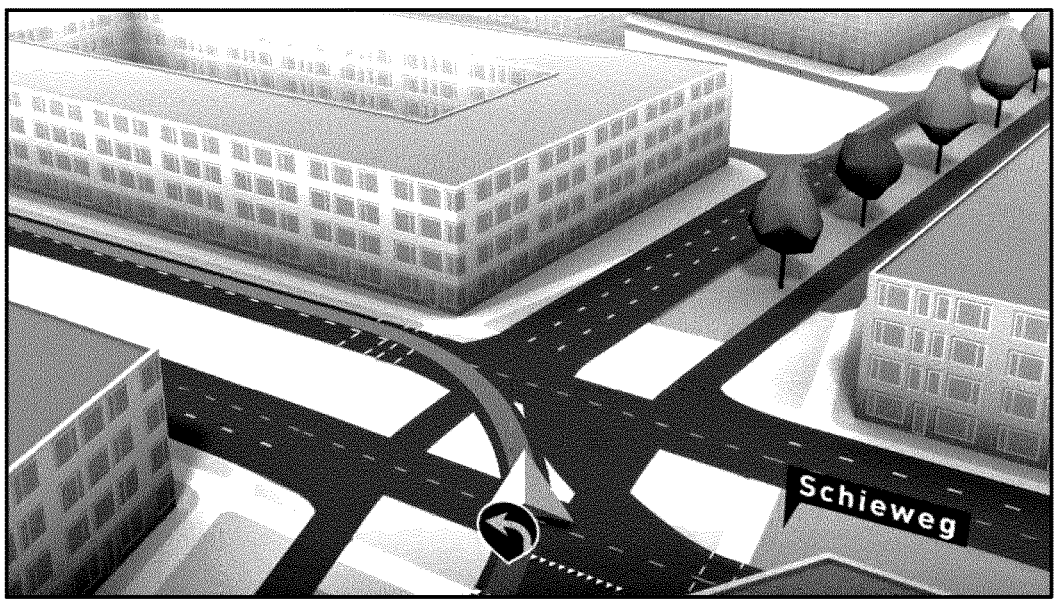

Finally, FIG. 16F shows the user in the process of making the manoeuvre 1007 at the junction.

Any of the methods in accordance with the present invention may be implemented at least partially using software e.g. computer programs. The present invention thus also extends to a computer program comprising computer readable instructions executable to perform, or to cause a navigation device to perform, a method according to any of the aspects or embodiments of the invention. Thus, the invention encompasses a computer program product that, when executed by one or more processors, cause the one or more processors to generate suitable images (or other graphical information) for display on a display screen. The invention correspondingly extends to a computer software carrier comprising such software which, when used to operate a system or apparatus comprising data processing means causes, in conjunction with said data processing means, said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to the method of any of the aspects or embodiments of the invention.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

The invention claimed is:

1. A device for generating navigation instructions for display on a display device of a portable navigation device, the device comprising one or more processors arranged to:
   access a repository storing digital map data pertaining to a navigable network along which the device can travel, the digital map data including data pertaining to available lanes of the navigable network;
   generate, for display on the display device, a three-dimensional perspective view of a model representative of the map data as though from a camera positioned at an elevation and pitch angle behind a current position of the device, that is updated to follow the device as it travels along a planned route, wherein the three-dimensional perspective view shows the available lanes of the navigable network, and wherein the planned route to be followed is shown in the view as a line, the line showing the route to be followed as passing along a determined current lane in which the device is travelling;
   adapt the generated view, in response to detecting that the determined current lane in which the device is travelling differs from a lane or lanes associated with a maneuver to be made at an upcoming decision point in order to follow the planned route, such that the line showing the route to be followed is shaped to indicate an instruction to the user to change lanes, wherein the instruction is initially positioned at a predetermined distance or time from the upcoming decision point or at a first opportunity to change lanes for the upcoming decision point; and
   adapt the generated view such that the line showing the route to be followed continues to indicate the instruction to the user to change lanes as the movement of the device is followed by the instruction moving concurrently with the position of the device, until a determination is made that the current lane of the device is changed in accordance with the instruction, wherein the concurrent movement of the instruction with the position of the device starts when the current position of the device is at a predetermined distance before the instruction, thereby maintaining the predetermined distance between the position of the device and the instruction.

2. The device as claimed in claim 1, wherein the instruction to change lanes is associated with the manoeuvre to be made at the upcoming decision point in order to follow the planned route.

3. The device as claimed in claim 1, wherein the one or more processors are further arranged to adapt the generated view, in response to the determination that the current lane of the device is changed in accordance with the instruction, such that the line showing the route to be followed no longer shows the instruction to the user to change lanes.

4. The device as claimed in claim 1, wherein, in use, the three-dimensional perspective view shows the available lanes of the navigable network by way of road markings.

5. The device as claimed in claim 4, wherein the road markings are only shown in the rendered view on parts of the navigable network relevant to the planned route.

6. The device as claimed in claim 4, wherein the road markings are only shown in the rendered view on parts of the navigable network local to a detected position of the device.

7. The device as claimed in claim 4, wherein the road markings are generated based on the digital map data.

8. The device as claimed in claim 1, wherein the one or more processors are further arranged to determine a current lane of the navigable network in which the device is travelling based on data received from one or more of a camera, lidar sensor, radar, global navigation satellite system (GNSS) receiver, and an inertial measurement unit.

9. The device as claimed in claim 1, wherein the three-dimensional perspective view as though from the camera positioned at the elevation and pitch angle behind the current position of the device includes an icon representative of the device in a current position of the device in the lanes of the navigable network.

10. The device as claimed in claim 1, wherein the line showing the route to be followed covers each of two or more lanes that can be occupied to successfully complete the manoeuvre to be made at an approaching junction in order to follow the planned route.

11. A method of generating navigation instructions for display on a display device of a portable navigation device, the method comprising: accessing a repository storing digital map data pertaining to a navigable network along which the device can travel, the digital map data including data pertaining to available lanes of the navigable network;
   generating, for display on the display device, a three-dimensional perspective view of a model representative of the map data as though from a camera positioned at an elevation and pitch angle behind a current position of the device, that is updated to follow the device as it travels along a planned route, wherein the three-dimensional perspective view shows the available lanes of the navigable network, and wherein the planned route to be followed is shown in the view as a line, the line showing the route to be followed as passing along a determined current lane in which the device is travelling;

adapting the generated view, in response to detecting that the determined current lane in which the device is travelling differs from a lane or lanes associated with a maneuver to be made at an upcoming decision point in order to follow the planned route, such that the line showing the route to be followed is shaped to indicate an instruction to the user to change lanes, wherein the instruction is initially positioned at a predetermined distance or time from the upcoming decision point or at a first opportunity to change lanes for the upcoming decision point; and adapting the generated view such that the line showing the route to be followed continues to indicate the instruction to the user to change lanes as the movement of the device is followed by the instruction moving concurrently with the position of the device, until a determination is made that the current lane of the device is changed in accordance with the instruction, wherein the concurrent movement of the instruction with the position of the device starts when the current position of the device is at a predetermined distance before the instruction, thereby maintaining the predetermined distance between the position of the device and the instruction.

12. A non-transitory computer readable medium comprising instructions which, when executed by one or more processors of a device, cause the device to perform a method for generating navigation instructions for display on a display device of a portable navigation device, the method comprising:

accessing a repository storing digital map data pertaining to a navigable network along which the device can travel, the digital map data including data pertaining to available lanes of the navigable network;

generating, for display on the display device, a three-dimensional perspective view of a model representative of the map data as though from a camera positioned at an elevation and pitch angle behind a current position of the device, that is updated to follow the device as it travels along a planned route, wherein the three-dimensional perspective view shows the available lanes of the navigable network, and wherein the planned route to be followed is shown in the view as a line, the line showing the route to be followed as passing along a determined current lane in which the device is travelling;

adapting the generated view, in response to detecting that the determined current lane in which the device is travelling differs from a lane or lanes associated with a maneuver to be made at an upcoming decision point in order to follow the planned route, such that the line showing the route to be followed is shaped to indicate an instruction to the user to change lanes, wherein the instruction is initially positioned at a predetermined distance or time from the upcoming decision point or at a first opportunity to change lanes for the upcoming decision point; and adapting the generated view such that the line showing the route to be followed continues to indicate the instruction to the user to change lanes as the movement of the device is followed by the instruction moving concurrently with the position of the device, until a determination is made that the current lane of the device is changed in accordance with the instruction, wherein the concurrent movement of the instruction with the position of the device starts when the current position of the device is at a predetermined distance before the instruction, thereby maintaining the predetermined distance between the position of the device and the instruction.

* * * * *